(12) United States Patent
Suzuki et al.

(10) Patent No.: US 8,239,145 B2
(45) Date of Patent: Aug. 7, 2012

(54) METHOD, DEVICE AND PROGRAM FOR PRESENTING INNER FORCE SENSE AND PROGRAM

(75) Inventors: Yuriko Suzuki, Yokohama (JP); Minoru Kobayashi, Kokubunji (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1088 days.

(21) Appl. No.: 10/593,784

(22) PCT Filed: Oct. 31, 2005

(86) PCT No.: PCT/JP2005/020026
§ 371 (c)(1),
(2), (4) Date: Sep. 22, 2006

(87) PCT Pub. No.: WO2006/064615
PCT Pub. Date: Jun. 22, 2006

(65) Prior Publication Data
US 2008/0249718 A1    Oct. 9, 2008

(30) Foreign Application Priority Data
Dec. 13, 2004 (JP) .................................. 2004-359772

(51) Int. Cl.
*G01L 5/00* (2006.01)
(52) U.S. Cl. .................... 702/41; 702/152; 345/156
(58) Field of Classification Search .................... 702/33, 702/41, 42, 43, 152, 153, 166, 167
See application file for complete search history.

(56) References Cited

U.S. PATENT DOCUMENTS

| | | | | |
|---|---|---|---|---|
| 4,191,507 A | * | 3/1980 | DeBerg | 416/117 |
| 5,459,382 A | * | 10/1995 | Jacobus et al. | 318/568.11 |
| 5,583,478 A | * | 12/1996 | Renzi | 340/407.1 |
| 6,046,726 A | * | 4/2000 | Keyson | 345/156 |
| 6,433,771 B1 | * | 8/2002 | Yocum et al. | 345/156 |
| 2004/0164960 A1 | * | 8/2004 | Jacobus et al. | 345/161 |

FOREIGN PATENT DOCUMENTS

| | | | | |
|---|---|---|---|---|
| JP | 07 281818 | | 10/1995 | |
| JP | 2001 022499 | | 1/2001 | |
| JP | 2001022499 | A * | 1/2001 | |
| JP | 2003-256105 | | 9/2003 | |
| JP | 2004 157677 | | 6/2004 | |

(Continued)

OTHER PUBLICATIONS

Suzuki et al, "Arrayed Air Jet Based Haptic Display: Implementing an Untethered Interface", Sep. 2003.*

(Continued)

*Primary Examiner* — Jeffrey R West
(74) *Attorney, Agent, or Firm* — Oblon, Spivak, McClelland, Maier & Neustadt, L.L.P.

(57) ABSTRACT

A force feedback method for presenting a force sense to an operator by jetting gas or liquid from a nozzle of jetting means according to a position or an orientation of a receiver is disclosed. In the force feedback method, the receiver is provided with an inclined side surface unit shaped to be inclined, outward from a center part of the receiver, with respect to an axis line of the receiver, and the force feedback method provides a force, to the receiver, including a component perpendicular to a jet direction of the gas or the liquid, by jetting the gas or the liquid to the inclined side surface unit.

12 Claims, 19 Drawing Sheets

FOREIGN PATENT DOCUMENTS

JP        2004157677 A  *  6/2004
JP        2005 004580        1/2005

OTHER PUBLICATIONS

Amemiya et al., "Portable Tactile Feedback Interface Using Air Jet", Bulletin of Computational Science Research Center, vol. 13, pp. 21-25. 2000.*

Yuriko Suzuki, et al., "An Untethered Haptic Display by arrayed Air-jets: Presentation of 3D objects", Technical Report of IEICE, vol. 103, No. 205, Jul. 17, 2003, 2 front pages, pp. 71-76.

Yuriko Suzuki, "Untethered Force Feedback Interface that Uses Air Jets", SIGGRAPH2004 website, http://www.siggraph.org/s2004/conference/etech/untech/untethered.php?=conference, Jun. 2004, pp. 1-2.

Maggie Orth, "Interface to Architecture: Integrating Technology into the Environment in the Brain Opera", Proceedings of the conference on Designing interactive Systems: processes, practices, methods and techniques, Symposium on Designing Interactive Systems, Amsterdam, the Netherlands, 1997, 2 front pages, pp. 265-275.

Yuriko Suzuki, et al., "An Untethered Force Feedback Display base on the Air Jet Interface", ITE Technical Report, Nov. 5, 2004, 4 pages.

Yuriko Suzuki, et al., "Design of Force Feedback Utilizing Air Pressure toward Untethered Human Interface", Short Talk:Visual and Perceptual Display of Information, Apr. 20-25, 2002, pp. 808-809.

Suzuki, Yuriko et al., "Design of Air Pressure Based Force Display Toward Untethered Human Interface" NTT Cyber Space Laboratories, vol. 43, No. 12, pp. 3643-3652, 2002. (With English Abstract).

Yuriko Suzuki et al, "Untethered Force Feedback Interface that Uses Air Jets," ACM SIGGRAPH 2004 Emerging Technologies, Los Angeles, CA; [SIGGRAPH '04], ACM, New York, NY, USA, Jul. 31, 2003, p. 30, XP002611501, DOI: DOI:10. 1145/1186155.1186186, ISBN: 978-1-59593-896-1.

* cited by examiner

- R1 DISTANCE FROM RECEIVER CENTER TO INNER BORDER OF INCLINED SIDE SURFACE UNIT
- R2 DISTANCE FROM RECEIVER CENTER TO OUTER BORDER OF INCLINED SIDE SURFACE UNIT $V_{PN}$: VECTOR FROM NOZZLE COORDINATES TO RECEIVER CENTER COORDINATES

METHOD, DEVICE AND PROGRAM FOR PRESENTING INNER FORCE SENSE AND PROGRAM

TECHNICAL FIELD

The present invention relates to a force feedback technique for providing a force to a receiver that is held by an operator over a jet of air and the like so as to provide force feedback to the operator.

BACKGROUND ART

From the past, as a force feedback method in VR (virtual reality) technique, there is a method for presenting a force to an operator by receiving an air jet with a receiver. As an example of an apparatus to which the method is applied, there is an apparatus shown in FIG. 19. The apparatus shown in FIG. 19 includes a jetting unit 6 that is provided with, on the surface, a plurality of nozzles 602 for jetting air 601 upward. The jet air 601 jetting from an area just below the receiver 1' or from an area around the area just below the receiver 1' is controlled according to a position of the receiver 1' that moves over the surface on which the nozzles 602 are arranged (refer to non-patent document 1, patent documents 1-3, for example).

In this case, the receiver 1' is a plane or a concave shape such as a hemisphere (a hemisphere in the example of FIG. 19), so that the receiver 1' presents a force in an upward direction that is in a jetting direction to an operator 7 who holds the receiver 1' itself or who holds an object to which the receiver 1' is attached.

[Patent document 1] Japanese Laid-Open Patent Application No. 2001-22499

[Patent document 2] Japanese Laid-Open Patent Application No. 2003-256105

[Patent document 3] Japanese Laid-Open Patent Application No. 2004-157677

[Non-patent document 1] Yuriko Suzuki, "Untethered Force Feedback Interface That Uses Air Jets", MVE of IEICE, pp. 71-76, July 2003

DISCLOSURE OF THE INVENTION

Problem to be Solved by the Invention

However, in this method, the direction of the force provided to the operator 7 is only the jetting direction of the air. For providing a force in a direction other than the upward direction, a method can be considered for preparing a nozzle that jets air in the direction. However, this method needs a larger apparatus. In addition to that, when laterally directed nozzles are placed at right and left sides, it becomes hard for the operator 7 to move its hand or arm from side to side. That is, there is a possibility that the nozzles hinder movement of the operator 7.

An object of the present invention is to provide a force feedback technique that can present a force, to an operator, in a direction including a lateral component with respect to the jetting direction of the air and the like with a simple configuration without placing a burden on the operator.

Means for Solving the Problem

The above object is achieve by a force feedback method for presenting a force sense to an operator by jetting gas or liquid from a nozzle of jetting means according to a position or an orientation of a receiver, wherein the receiver is provided with an inclined side surface unit shaped to be inclined, outward from a center part of the receiver, with respect to an axis line of the receiver, including:

providing a force, to the receiver, including a component perpendicular to a jet direction of the gas or the liquid by jetting the gas or the liquid to the incline side surface unit.

The present invention can be also configured as a force feedback apparatus used for a force feedback method for presenting a force sense to an operator by jetting gas or liquid from a nozzle of jetting means according to a position or an orientation of a receiver, including:

jet control means for controlling a jet amount or a jet direction of the gas or the liquid jetted from the nozzle of the jetting means according to a position or an orientation of the receiver measured by receiver measurement means that is connected to the force feedback apparatus, wherein the receiver is provided with an inclined side surface unit shaped to be inclined, outward from a center part of the receiver, with respect to an axis line of the receiver, and the jet control means controls the jetting means so as to jet the gas or the liquid to the inclined side surface unit in order to provide a force, to the receiver, including a component perpendicular to a jet direction of the gas or the liquid.

In the force feedback apparatus, the receiver may be provided with a deformation mechanism for changing a position or an orientation of the inclined side surface unit, and the force feedback apparatus may further include receiver side surface unit control means for controlling the deformation mechanism according to the position or the orientation of the receiver measured by the receiver measurement unit.

In addition, the force feedback apparatus may include virtual object calculation means for calculating a virtual object in a virtual space according to the position or the orientation of the receiver measured by the receiver measurement means, and causing virtual object display means to display the virtual space including the virtual object based on a result of the calculation.

In addition, in the force feedback apparatus, when the jetting means has a structure where a plurality of nozzles are arranged on a plane, and the receiver is placed at a predetermined height on the plane, the jet control means may select a nozzle that is positioned between an inner border of the inclined side surface unit of the receiver and an outer border of the inclined side surface unit wherein an angle difference between a direction from the nozzle to a center of the receiver and a direction of the force to be provided to the receiver is equal to or less than a predetermined value, and causes the selected nozzle to jet the gas or the liquid in order to provide a force, to the receiver, including a component perpendicular to a jet direction of the gas or the liquid.

In addition, the present invention can be also configured as a program for causing a computer to function as each means in the force feedback apparatus.

Effect of the Invention

According to the present invention, a force including a (lateral) component perpendicular to the jetting direction can be presented with a simple configuration using the jetting means that jets the gas or the liquid in only one direction without placing a burden on the operator.

In addition, even when a position or an inclination of the receiver changes with respect to the jetting direction of the jet gas or liquid, the direction of the force to be presented can be controlled by controlling the inclined side surface unit by the deformation mechanism of the inclined side surface unit. In addition, the jet control means properly selects a nozzle that jets the gas or the liquid so that the gas or the liquid can be jetted onto the inclined side surface unit. In addition, according to the present invention, the virtual object in the virtual space can be changed according to the position or the orientation of the receiver.

DESCRIPTION OF REFERENCE SIGNS

Figure 1:
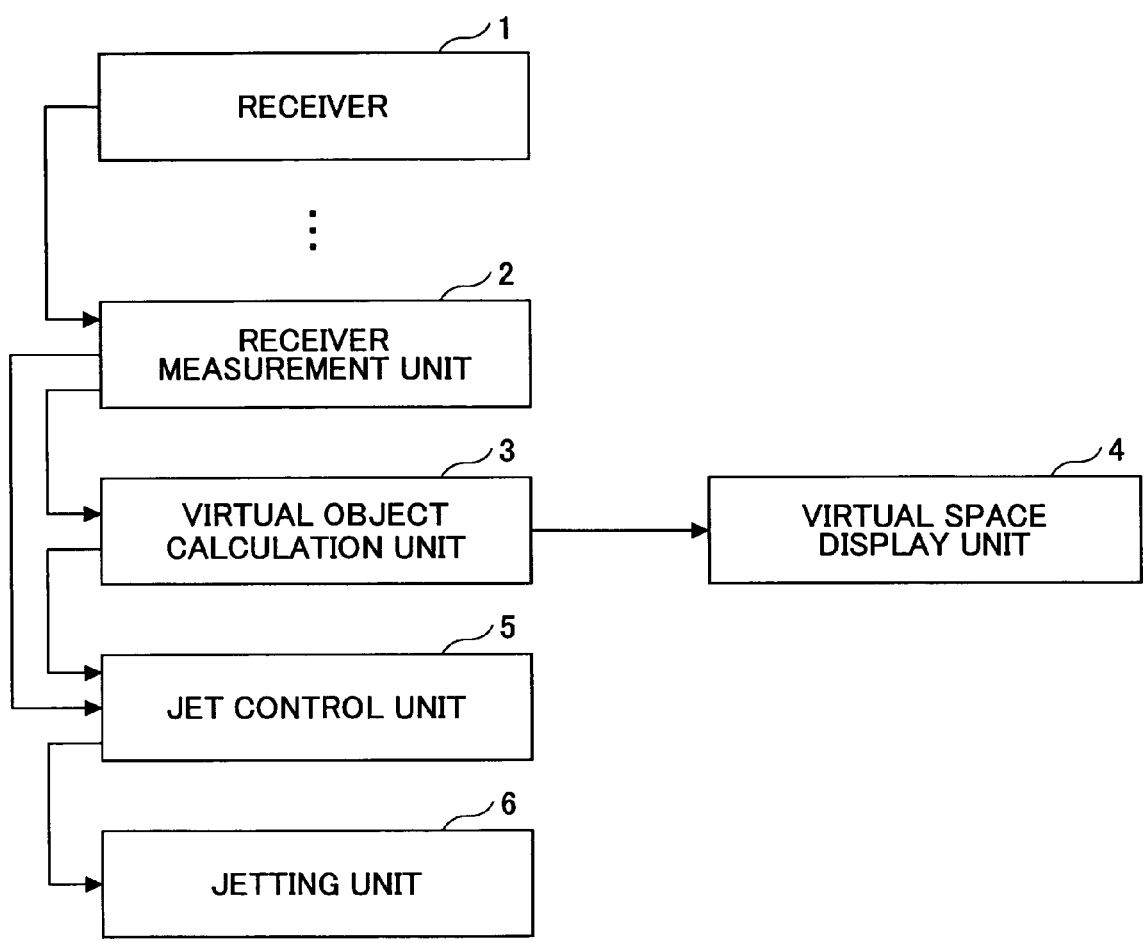
FIG. 1 is a block diagram of the force feedback apparatus of an embodiment 1.

1: receiver, 101: center unit, 102: inclined side surface unit, 102a, 102b: blade
2: receiver measurement unit
3: virtual object calculation unit
4: virtual space display unit
5: jet control unit
6: jetting unit, 601: jet air, 602: nozzle
7: operator
8: receiver side surface unit control unit

PREFERRED EMBODIMENTS FOR CARRYING OUT THE INVENTION

In this embodiment, a force that includes a (lateral) component perpendicular to the jetting direction is presented, which is different from the conventional scheme in which a planar or concave receiver receives a jet of air so as to present a force in the jetting direction. For realizing presenting the force that includes a (lateral) component perpendicular to the jetting direction, the receiver is provided with an inclined side surface unit including an inclined surface or a surface curved like a circular arc for letting the jet of air go to the outside of the side of the receiver, and the jetting unit is controlled such that the air jet impinges on the inclined side surface unit. In this embodiment, the force including the (lateral) component perpendicular to the air jetting direction can be presented.

Therefore, by gearing the air jetting to an image showing that an operator contacts an object from a lateral side, the operator can feel that something makes contact from the lateral side. According to this method, even though the jetting unit that jets air only in one direction is used, the (lateral) force perpendicular to the jetting direction can be provided in addition to the force of the jetting direction. By the way, the techniques described in this embodiment can be applied to a field of amusement, for example.

Embodiment 1

Figure 2:
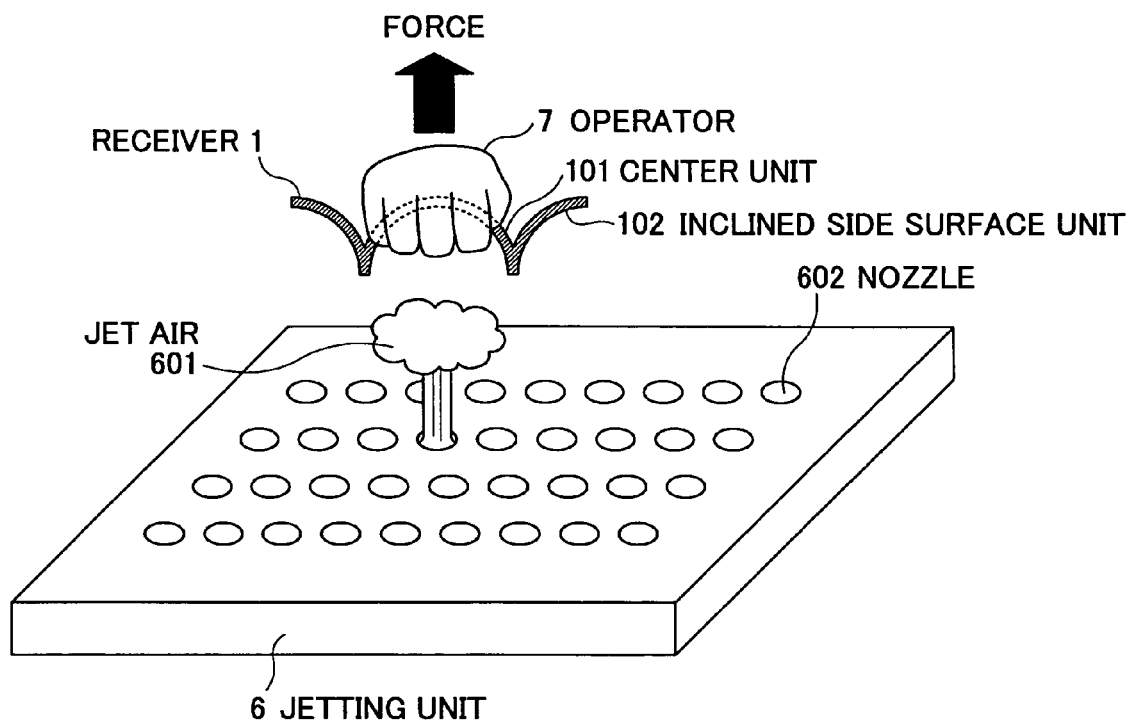
FIG. 2 is a schematic diagram showing a relationship among a receiver, a jetting unit and an operator of the force feedback apparatus of the embodiment 1.
Figure 3:
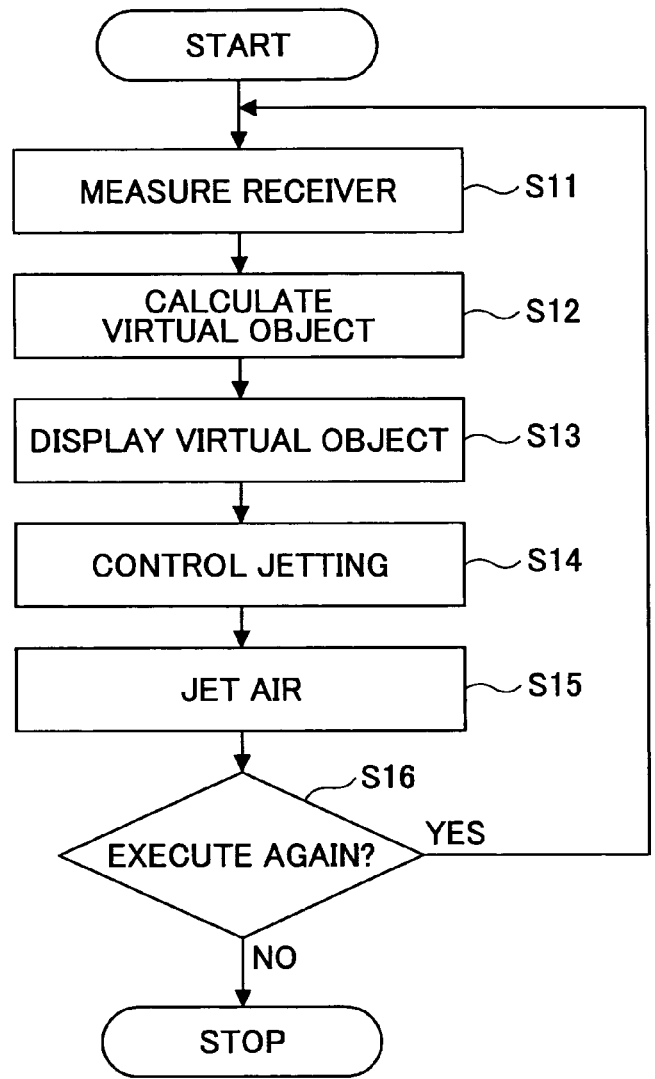
FIG. 3 is a flowchart of operation processes of the force feedback apparatus of the first embodiment.

FIG. 1 shows a block diagram showing a configuration of the force feedback apparatus of the embodiment 1. FIG. 2 shows a schematic diagram of a relationship between the operator and the jetting unit of the force feedback apparatus. FIG. 3 shows a flowchart of processes of the force feedback apparatus.

As shown in FIG. 1, the force feedback apparatus of this embodiment includes a virtual object calculation unit 3 and a jet control unit 5. A jetting unit 6 is connected to the jet control unit 5. A receiver measurement unit 2 for measuring a position and an orientation of the receiver 1 is connected to the virtual object calculation unit 3 and to the jet control unit 5. A virtual space display unit 4 is connected to the virtual object calculation unit 3. In the following, each component shown in FIG. 1 is described in detail. In the description, FIG. 2 is referred to as necessary.

As shown in FIG. 2, the receiver 1 receives jet air 601 jetted from the nozzle 602 of the jetting unit 6. By the way, although a gas other than the air or a liquid or the like can be jetted from the nozzles 602, an example in which the air is used is described in this embodiment. The operator 7 holds the receiver 1. The operator 7 may hold an object such as a bar with a hand, wherein the receiver 1 is attached to the tip of the bar. In addition, the operator 7 may attach the receiver 1 to a hand, body, or clothing of the operator 1. The operator 7 can receive a force sense via the receiver 1.

As shown in FIG. 2, the receiver 1 includes a center unit 101 for receiving the jet air 601 and conveying a force in the jetting direction to the operator 7, and an inclined side surface unit 102 for conveying a force including a (lateral) component perpendicular to the jetting direction. The inclined side surface unit 102. The inclined side surface unit 102 may be configured to be one unit or may be configured to include divided units that are divided into more than one unit.

The inclined side surface unit 102 has a shape that is inclined, with respect to the axis line of the receiver 1, toward the outside from the center part of the receiver 1. By the way, the axis line of the receiver 1 is a line along the jetting direction of the jet air 601 when the receiver 1 takes a normal attitude. That is, when the jetting direction is perpendicular with respect to a horizontal plane, the axis line of the receiver 1 is a line perpendicular to the horizontal plane when the receiver is put on the horizontal plane. When the jet air 601 impinges on the inclined side surface unit 102, the air flows with a (lateral) component perpendicular to the jetting direction. By changing the flow of the air, the force including the (lateral) component perpendicular to the jetting direction occurs in reaction to the change of the flow so that the force is conveyed to the operator 7. As will be described later, a specific shape of the inclined side surface unit 102 can be configured to be an inclined plane, or a surface curved like a circular arc, for example.

The receiver measurement unit 2 is an apparatus configured to always detect the position and the orientation of the receiver 1. The receiver measurement unit 2 can be a camera, a magnetic sensor, a supersonic sensor, an infrared sensor, a detection means for detecting a pre-attached mark by analyzing the image, or the like.

The virtual object calculation unit 3 is realized by a computer, and the virtual object calculation unit 3 calculates states (position, shape, color and the like) of a virtual object displayed on the virtual space display unit 4 according to the position or the orientation of the receiver 1 measured by the receiver measurement unit 2. For example, the virtual object calculation unit 3 generates a virtual object that moves in conjunction with the detected position of the receiver 1. The virtual object calculation unit 3 may be configured to calculate and generate a virtual object according to the detected position and orientation of the receiver 1 or according to states of another virtual object.

The virtual space display unit 4 is a means for displaying a virtual space including the virtual object based on the calculation result of the virtual object calculation unit 3, and can be realized by using a projector, for example.

The jet control unit 5 controls an air jet position of each nozzle 602 of the jetting unit 6 and controls a jet amount of the jet air 601 according to a position or an orientation of the receiver 1 measured by the receiver measurement unit 2 or according to states of a predetermined virtual object in the virtual space. In addition, jetting direction of the nozzle 602 can be variable, and in this case, the jet control unit 5 controls the jetting direction in addition to the jet amount. For example, for providing a force sense to the operator, the jet control unit 5 determines a particular nozzle 602 from which air is jetted and determines a jet amount and a jet direction of the air jetted from the nozzle 602 according to the position and the orientation of the receiver 1. In addition, since there is a case where the state of the virtual object is determined by another factor irrespective of the position or the orientation of the receiver 1, the jet amount of the air jetted from the particular nozzle 602 may be determined according to the state of the virtual object. The jet control unit 5 can be realized by a computer.

The jetting unit 6 jets the jet air 601 according to control by the jet control unit 5. As a concrete example of the jetting unit 6, there is an apparatus in which one or more nozzles 602 for jetting air upward are arranged on a horizontal plane such as a desk.

The virtual object calculation unit 3 and the jet control unit 5 of the force feedback apparatus in this embodiment can be realized by loading a program, on a computer, for causing the computer to execute processes of these function units. The program can be provided by being recorded on a recording medium such as a CD-ROM, or can be provided via a network.

Operation of the force feedback apparatus shown in FIG. 1 is described with reference to a flowchart of FIG. 3. The receiver measurement unit 2 detects a position or an orientation of the receiver 1 that is held by the operator 7 or attached to the operator 7 (step 11).

The virtual object calculation unit 3 calculates states (position, shape and the like) of a virtual object in a virtual space according to the position or the orientation of the receiver 1 measured by the receiver measurement unit 2 (step 12). For example, when the receiver moves so as to push down the virtual object, the states of the virtual object are calculated such that a corresponding part of the virtual object sinks.

The virtual space display unit 4 displays the virtual space including the virtual object based on the calculation result of the virtual object calculation unit 3 (step 13). The virtual space may include another virtual object.

In addition, the jet control unit 5 determines at least a nozzle 602 from which air is jetted in the jetting unit 6 and a jet amount so as to jet air to the center unit 101 or the inclined side surface unit 102 of the receiver 1 according to the position or the orientation of the receiver 1 measured by the receiver measurement unit 2 or according to the states of the virtual object in the virtual space 6, and the jet control unit 5 sends a control signal to the jetting unit 6 (step 14). For example, for providing a vertically upward force to the receiver 1 in response to the operator pushing the virtual object directly below, the jet control unit 5 controls the jetting unit 6 to jet air from a nozzle 602 directly below the receiver 1 by an amount determined according to hardness and the like of the virtual object.

Then, the jetting unit 6 jets air from a particular nozzle 602 based on the control signal from the jet control unit 5 (step 15). Then, when the event process is executed again, the step returns to step 11. When the event process is not executed again, the process ends (step 16).

In the above-mentioned processes, processes from steps 12-13 and the processes of steps 14-15 are not necessarily performed in this order. For example, after the process of step 11, the processes of steps 12-13 and the processes of steps 14-15 can be performed in parallel.

(About Receiver 1)

Next, the receiver 1 is described in detail.

The receiver 1 of this embodiment is configured to include an inclined side surface unit 102 having a curved surface curved like a circular arc or an inclined surface on the outside (periphery) of the center unit 101 of a plane shape or a concave shape such as a hemisphere.

Figure 4A:
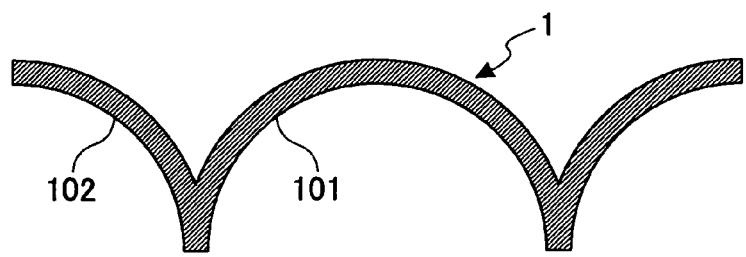
FIG. 4A is a cross section (1) of the receiver in the embodiment 1.
Figure 4B:
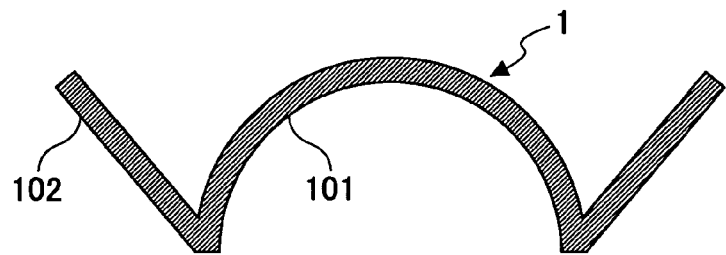
FIG. 4B is a cross section (2) of the receiver in the embodiment 1.
Figure 4C:
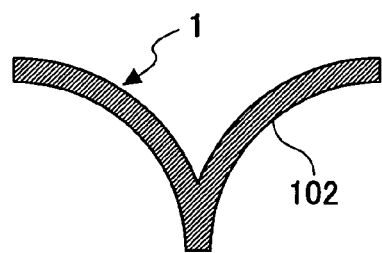
FIG. 4C is a cross section (3) of the receiver in the embodiment 1.

FIGS. 4A-4C shows a cross section of an example of the receiver 1. FIG. 4A shows a receiver 1 in which a concave shaped part that is a hemisphere is formed at the center as a center unit 101, and a curved surface unit curved like a circular arc is provided as the inclined side surface unit 102. FIG. 4B shows a receiver 1 in which a concave shaped part that is a hemisphere is formed at the center as the center unit 101, and an inclined plane is provided as the inclined side surface unit 102.

As shown in FIGS. 4A and 4B, by forming the inclined side surface unit 102 to be arc shaped or a similar shape or an inclined surface, air that flows from beneath changes its direction at the inclined side surface unit 102 so as to flow with a (lateral) component perpendicular to the jetting direction.

Figure 4D:
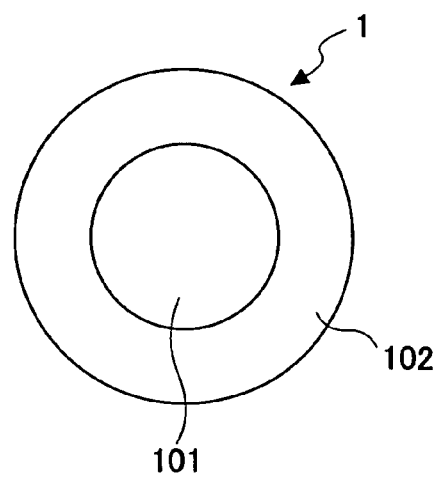
FIG. 4D is a bottom view of the receiver of the embodiment 1.
Figure 4E:
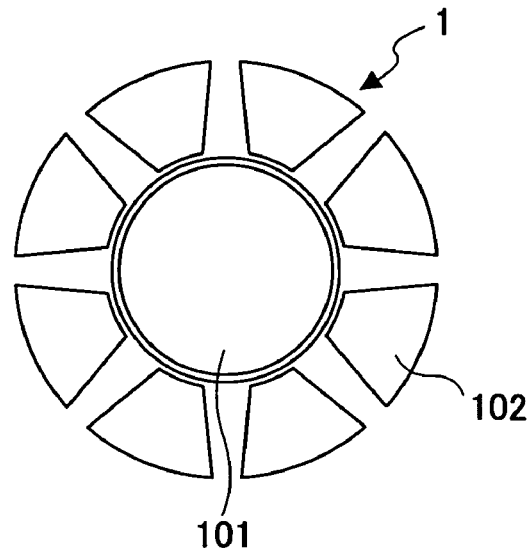
FIG. 4E is a bottom view of another receiver of the embodiment 1.

Such inclined side surface unit 102 can be provided to the whole periphery or a part of the periphery of the receiver 1. FIG. 4D is a bottom view of the receiver 1, and shows an example in which the inclined side surface unit 102 is provided all around the center unit 101. FIG. 4E is also a bottom view of the receiver 1, and shows an example in which the inclined side surface unit 102 includes a plurality of divided units. By the way, as shown in FIG. 4C, the receiver 1 can be a shape that includes only the inclined side surface unit 102 that is curved like an arc without the center unit 101. FIG. 4C shows an example in which the center unit 101 shown in FIG. 4A is removed, and the inclined side surface unit 102 provided around the circle in FIG. 4A is placed at the center. Also in this case, as shown in FIGS. 4D and 4E, the inclined side surface unit 102 can be formed to be one body or may be formed to include a plurality of divided units. In addition, the inclined side surface unit 102 can be provided only on a part of the circumstance of the center point.

Figure 5A:
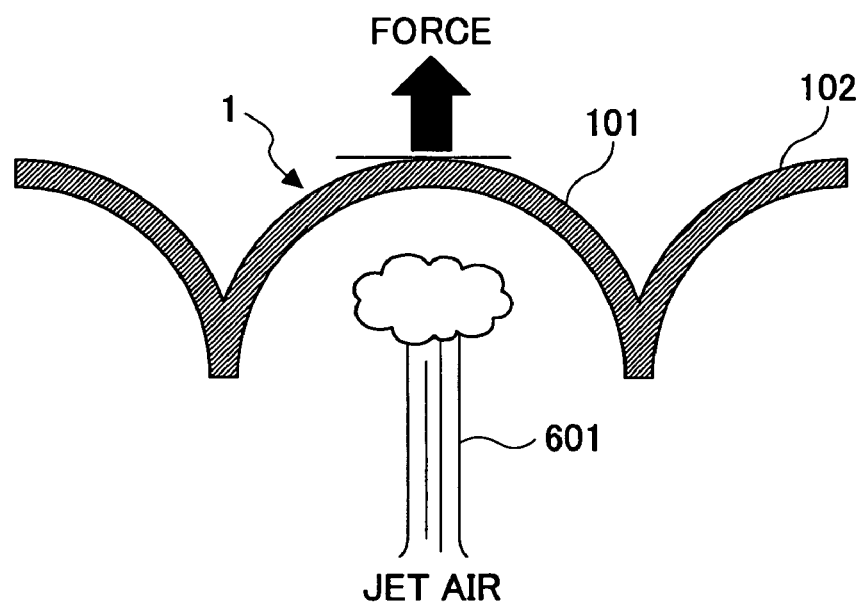
FIG. 5A is a schematic diagram (1) showing jet air impinging on the receiver of the embodiment 1.
Figure 5B:
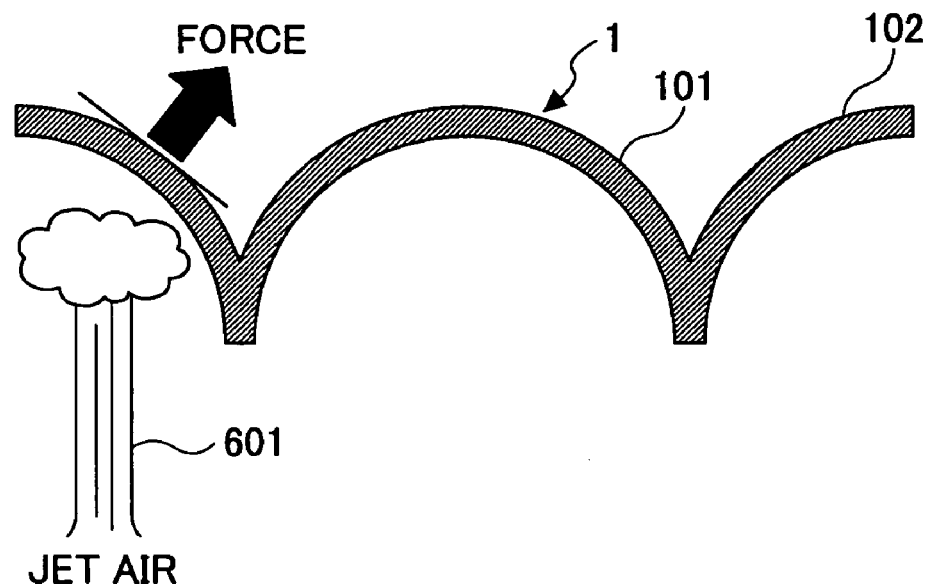
FIG. 5B is a schematic diagram (2) showing jet air impinging on the receiver of the embodiment 1.
Figure 5C:
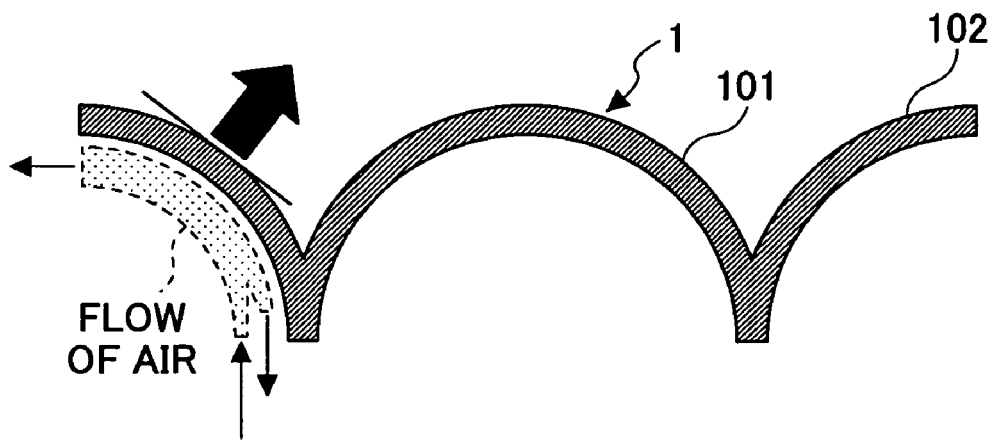
FIG. 5C is a schematic diagram (3) showing jet air impinging on the receiver of the embodiment 1.

Operation of the jet air 601 for the receiver 1 configured in the above mentioned way is described. As shown in FIG. 5A, when the jet air 601 impinges on the center unit 101 of the receiver 1, a force of the jetting direction or a direction near the jetting direction can be provided to the operator as usual. In addition, as shown in FIG. 5B, when the jet air impinges on a part of the inclined side surface unit 102 of the receiver 1, the jet air 601 impinges on the inclined side surface unit 102 and the air flows out mainly laterally to outside of the side surface as shown in FIG. 5C.

Figure 6:
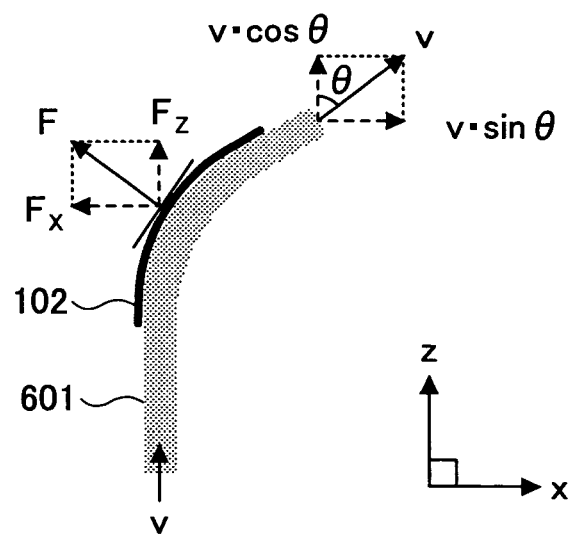
FIG. 6 is a figure for explaining a force generated when jet air impinges on the inclined side surface unit.

A force generated when the jet air 601 impinges on the inclined side surface unit 102 is described with reference to FIG. 6.

The force generated when the jet air 601 impinges on the inclined side surface unit 102 can be obtained from change of momentum between before impinge and after impinging of the jet air. Assuming that a jet air of density $\rho$ [kg/m$^3$], velocity of flow v [m/s], and quantity of flow Q [m$^3$/s] impinges on a still inclined surface as shown in FIG. 6 and that the direction of flow changes by an angle $\theta$ (0<$\theta$<90 degrees), and assuming that a x component of a force F [N] received by the inclined surface is $F_x$ and a z component is $F_z$, the following equations hold true. In the equations, it is assumed that the jet air is a nonviscous fluid in which static pressure is even at all inside points, and that loss of kinetic energy due to hitting of the jet air on the inclined surface and friction on the inclined surface is neglected.

$$0 = -F_x + \rho Q v \cdot \sin \theta$$

$$\rho Q v = F_z + \rho Q v \cdot \cos \theta$$

Accordingly, $F_x$ and $F_z$ can be obtained in the following way.

$$F_x = \rho Q v \cdot \sin \theta$$

$$F_z = \rho Q v \cdot (1 - \cos \theta)$$

Therefore, by changing the flow of the air, with the inclined surface of the receiver inclined side surface unit 102, to a flow including a (lateral) component perpendicular to the jetting direction, a force F including a force $F_x$ of the (lateral) component perpendicular to the jetting direction of the jet air 601 is generated so that the force can be presented to the operator.

Therefore, when applying a force in a right direction to the operator 7 who holds the receiver 1, air is jetted such that the air impinges on a left side of the inclined side surface unit 102 (FIG. 5B). For applying a force other than the right direction, it is only enough to jet air to a reverse side of the inclined side surface unit 102 in the same way.

Figure 5D:
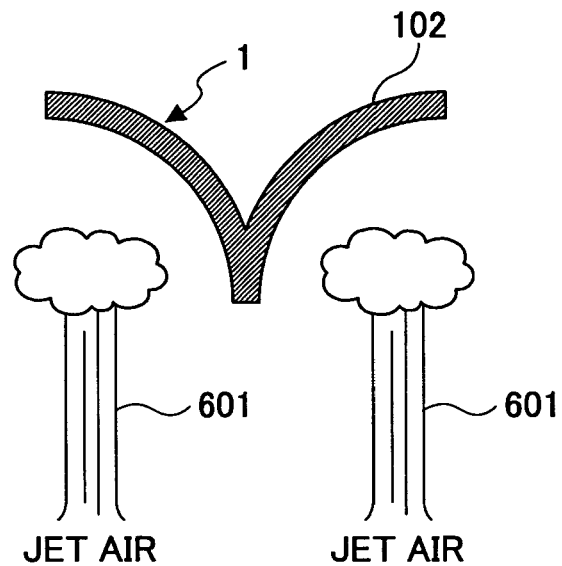
FIG. 5D is a schematic diagram (4) showing jet air impinging on the receiver of the embodiment 1.

When presenting a force including a lateral component for the receiver having only the inclined side surface unit 102 as shown in FIG. 4C, the method the same as shown in FIG. 5B can be applied. But, for presenting an upward force, the jet air is controlled such that the jet air 601 impinges on both of opposing sides or the whole surface of the inclined side surface unit 102 (refer to FIG. 5D).

As shown in the above equations, an upward force $F_z$ is generated with the lateral force $F_x$. According to the above equations, a ratio of the upward force $F_z$ to the lateral force $F_x$ is $(1-\cos\theta)/\sin\theta$, so that, in the before-mentioned range (0<$\theta$<90 degrees), the smaller the angle $\theta$ is, the smaller the upward force $F_z$ is, compared to the lateral force $F_x$. However, when the angle $\theta$ is decreased for decreasing the upward force $F_z$, the absolute amount of the force becomes small so that the lateral force $F_x$ also becomes small.

Thus, it is desirable that the inclined side surface unit 102 has an inclination angle and a shape such that an intended lateral force can be provided and an upward force is as small as possible compared to the lateral force according to the states (jet amount, jet speed and the like) of the jet air and the states (area, friction and the like) of the inclined surface. In addition, it is desirable to control the impinging position of the jet air 601 such that the upward force becomes small.

In the receiver of FIG. 4D, the inclined side surface unit 102 is provided as a ring shape with respect to an axis parallel to the jet direction of the air. Therefore, the receiver has a merit in that, by impinging the jet air on an arbitrary position of the inclined side surface unit 102, flow of air can be changed to an arbitrary (lateral) direction perpendicular to the jetting direction so that a force of an arbitrary (lateral) direction perpendicular to the jetting direction can be presented.

However, as to a receiver, such as the receiver 1 of FIG. 4D, having the inclined side surface unit formed by an inclined surface of a curved surface shape in which a shape of a cross section, parallel to the xy plane, is a convex curve with respect to a position on the xy plane of the nozzle, there is a demerit in that the strength of the lateral force becomes small. In the following, the reason is described with reference to FIG. 7.

Figure 7:
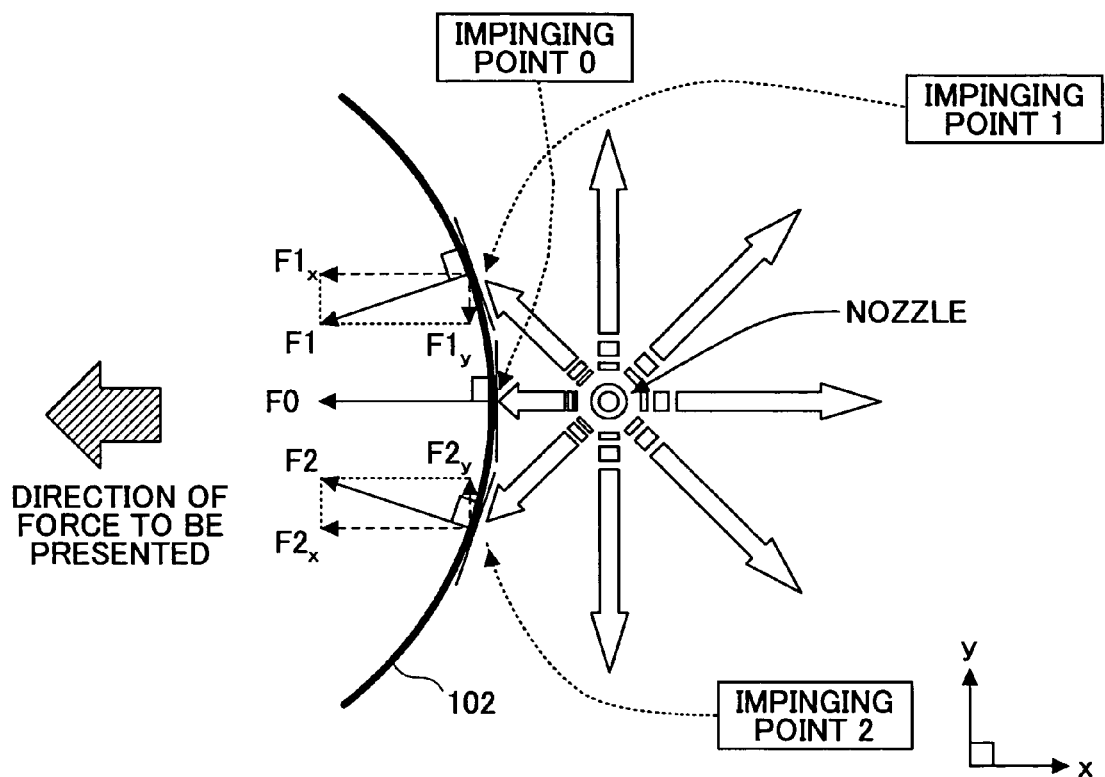
FIG. 7 is a figure for explaining a force generated when jet air impinges on the inclined side surface unit including inclined surfaces each shaped like a curved surface.

FIG. 7 is a diagram showing a situation in which the jet air impinges on the inclined side surface unit 102 having the curved surface shaped inclined surface so that a force perpendicular (left side direction in the figure) to the jet direction is applied on the inclined side surface unit 102. By the way, FIG. 7 is a diagram showing a horizontal cross section of the inclined side surface unit 102 viewed from the jet direction.

As shown in FIG. 7, the jet air widens radially, and the jet air impinges on an impinging point 0 of the inclined side surface unit 102, and impinging points 1 and 2 that are points around the impinging point 0. The air impinged on the impinging point 0 generates F0 that is a lateral force directed to the left side in FIG. 7. However, since the inclined surface is shaped to be a convex curved surface when seen from the nozzle, air impinging on the impinging point 1 or the impinging point 2 generates a force F1 or F2 directed to a direction different from the intended direction (friction on the surface of the plane is neglected here).

F1 can be divided into $F1_x$ and $F1_y$, and F2 can be divided into $F2_x$ and $F2_y$, and $F1_x$ and $F2_x$ are presented as lateral forces directed to the left side in FIG. 7. Since each of $F1_x$ and $F2_x$ is a component force, they are smaller than F1 and F2, respectively. In addition, since each of the impinging points 1 and 2 is further from the air jet nozzle, a force of a direction the same as that of a desired force becomes further smaller.

Figure 8A:
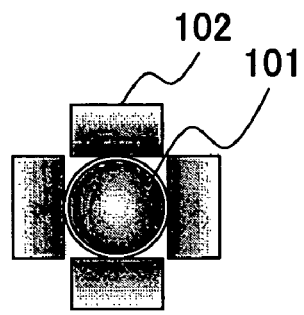
FIG. 8A is a figure of a receiver, seen from underneath, in which the inclined surface of the inclined side surface unit is shaped like a part of a cylinder.
Figure 8B:
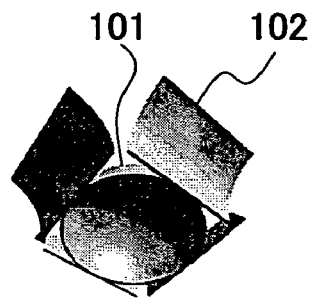
FIG. 8B is a figure of the receiver, seen from an angle, in which the inclined surface of the inclined side surface unit is shaped like a part of a cylinder.
Figure 8C:
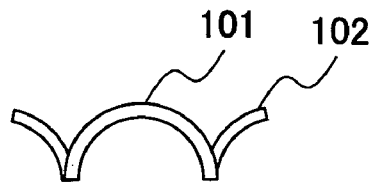
FIG. 8C is a longitudinal sectional view of the receiver in which the inclined surface of the inclined side surface unit is shaped like a part of a cylinder.

Therefore, for increasing the strength of the lateral force, although directions that can be presented may be limited, the inclined surface of the inclined side surface unit 102 can be shaped like a part of a cylinder as shown in FIGS. 8A-8C. FIG. 8A is a diagram of the receiver 1, seen from underneath, in which each inclined surface of the inclined side surface unit 102 is shaped like a part of a cylinder, FIG. 8B is a diagram of the receiver when seen from an angle, and FIG. 8C is a longitudinal sectional view of the receiver 1.

Figure 9A:
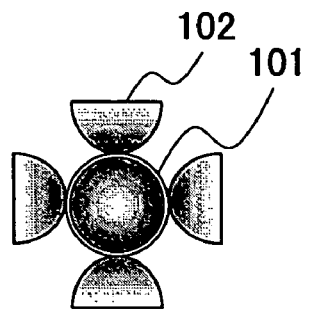
FIG. 9A is a figure of a receiver, seen from underneath, in which the inclined surface of the inclined side surface unit of the receiver is configured to be a curved surface shape in which a cross section, parallel to the xy plane, of the inclined surface is a concave curved line with respect to a position on the xy plane of the nozzles.
Figure 9B:
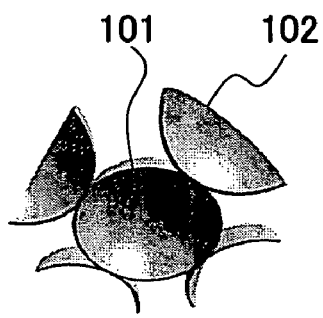
FIG. 9B is a figure of the receiver, seen from an angle, in which the inclined surface of the inclined side surface unit of the receiver is configured to be a curved surface shape in which a cross section, parallel to the xy plane, of the inclined surface is a concave curved line with respect to a position on the xy plane of the nozzles.
Figure 9C:
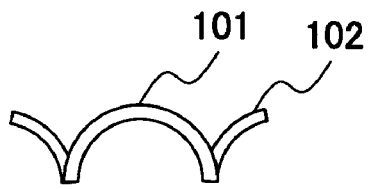
FIG. 9C is a longitudinal sectional view of the receiver in which the inclined surface of the inclined side surface unit of the receiver is configured to be a curved surface shape in which a cross section, parallel to the xy plane, of the inclined surface is a concave curved line with respect to a position on the xy plane of the nozzles.

In addition, as shown in FIGS. 9A-9C, the inclined surface of the inclined side surface unit 102 of the receiver 1 can be configured to be a curved surface shape in which cross section, parallel to the xy plane, of the inclined surface is a concave curved line with respect to a position on the xy plane of the nozzles. FIG. 9A is a diagram of the receiver 1 seen from underneath, FIG. 9B is a diagram of the receiver when seen from an angle, and FIG. 9C is a longitudinal sectional view of the receiver 1.

By forming the inclined surface of the inclined side surface unit 102 to be the shape shown in FIGS. 8A-8C, since all of the air impinging on the impinging point provides a force of the same direction that is perpendicular to the inclined surface, the strength of the force to be provided becomes large. In addition, by forming the inclined surface of the inclined side surface unit 102 to be the shape shown in FIGS. 9A-9C, since the distance between the nozzle and the impinging point is shorter than that for the inclined surface of FIG. 4D, a force to be provided laterally becomes large.

(Concrete Example for Presenting a Force)

A concrete example is described in the following in which the operator 7 moves the receiver 1 so that the force is presented to the operator 7.

The receiver measurement unit 2 measures a position and an orientation of the receiver 1 that change according to movement of the receiver 1 by the operator 7. Then, according to the position and the orientation, an object corresponding to the receiver 1 in the virtual space moves. When the object contacts another object from above or from the side, the jet control unit 5 controls the jetting unit 6 to jet air to the receiver 1 so as to present an upward force or a lateral force to the operator 7. In the following, it is described in more detail.

First, for providing an upward force when the object corresponding to the receiver 1 in the virtual space contacts another object from above or from approximately above, a jet air 601 is jetted from a nozzle 602 near a point right below the center unit 101 of the receiver 1 such that the jet air 601 impinges on the center unit 101 of the receiver 1 (FIG. 5A).

For providing a force including a lateral component when the object corresponding to the receiver 1 in the virtual space contacts another object laterally or near laterally, the air is jetted from a nozzle 602 of the jetting unit 6 such that the jet air 601 impinges on the inclined side surface unit 102 of the receiver 1. In this case, the jetting unit 6 is controlled such that the air jets from a nozzle 602 from which air that easily flows in the lateral direction along the surface is jetted as shown in FIG. 5C as much as possible.

Figure 10A:
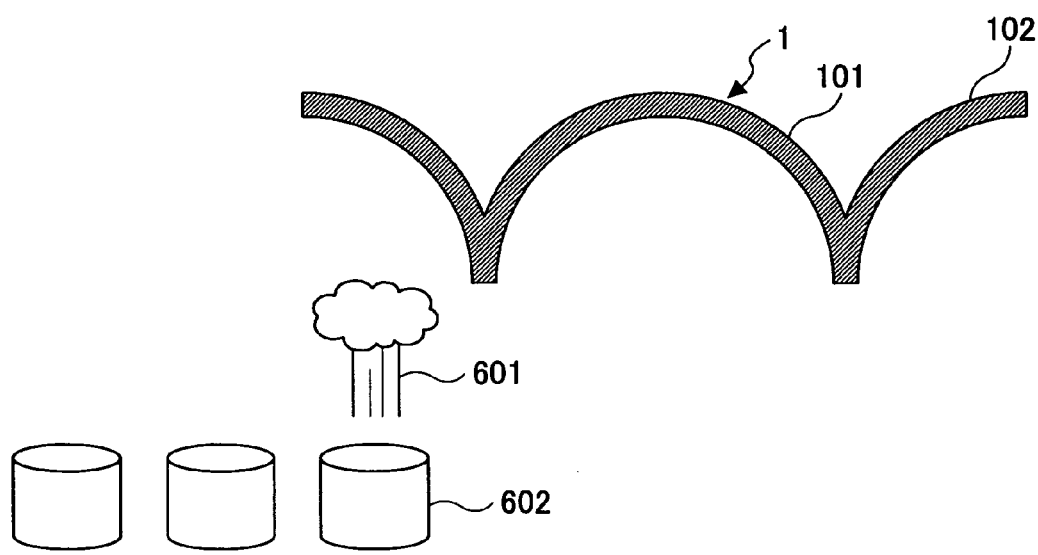
FIG. 10A is a schematic diagram (5) showing jet air impinging on the receiver of the embodiment 1.
Figure 10B:
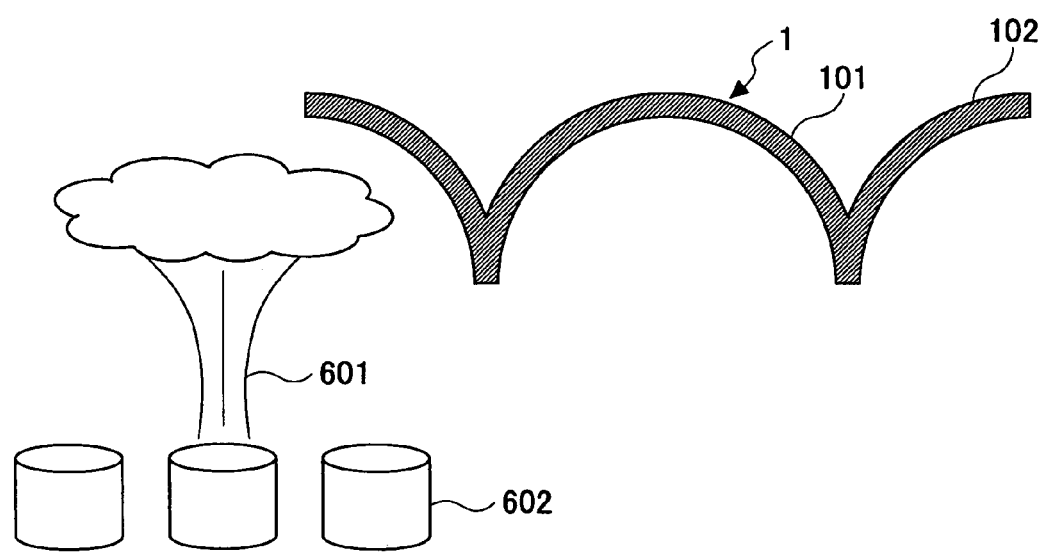
FIG. 10B is a schematic diagram (6) showing jet air impinging on the receiver of the embodiment 1.

However, the further the jet air 601 is from the nozzle 602, the wider the jet air 601 becomes. Therefore, it is necessary to consider this fact. More particularly, as shown in FIG. 10A, when the distance between the inclined side surface unit 102 of the receiver 1 and the nozzle 602 is short, air is jetted from a nozzle 602 near the inclined side surface unit 102 of the receiver 1. In addition, as shown in FIG. 10B, when the receiver 1 is positioned higher than the case of FIG. 10A from the plane on which the nozzles 602 are arranged, air is jetted from a nozzle 602 distant from the inclined side surface unit 102 according to broadening of the air such that the jet air 601 impinges on the inclined side surface unit 102 of the receiver 1.

As mentioned above, by presenting a force including a contact lateral component to the operator 7 in conjunction with an image showing lateral contact to an object, the operator 7 can feel that the operator 7 contacts the object from a lateral side.

As a display method by the virtual space display unit 4, a general display or a head mounted display can be used, or projection by a projector can be used. In this case, a viewpoint position of the operator 7 is detected by a position detection apparatus that uses an optical scheme or a magnetic scheme so as to display a virtual space according to the viewpoint of the operator 7. In addition, by displaying virtual space images corresponding to positions of right and left eyes of the operator 7, and by attaching, to the operator 7, a head mount display or stereovision eyeglasses by which the images can be viewed by the left and right eyes, the virtual space can be displayed stereoscopically.

Especially, it is a method placing small burden on the operator 7 that images for both eyes are projected onto an area where a force is presented by a projector, and that the operator 7 sees the images by wearing the stereovision eyeglasses. According to this display method, since the virtual object is stereoscopically displayed in the area where the force is presented, positions for presenting vision and force sense can be matched so that a more intuitive experience can be acquired. In addition, since air is used for conveying a force, the image display is not hindered. As a stereoscopic display method using the stereovision eyeglasses, there are a method for using red and blue images and red and blue eyeglasses, a method for using a deflected image and deflection eyeglasses, and a method for using right/left images that are switched in a time-division manner, and using shutter eyeglasses.

In addition, for integrating the virtual space display unit 4 with the jetting unit 6 by a stereoscopic image based on viewpoints of the both eyes of the operator 7, there is a method in which a projector is attached just above a desk as the jetting unit 6 having the nozzles 602, and the image of the virtual space constructed by a computer is projected onto the desk. In this method, the virtual space display unit 4 projects, onto the desk, left and right virtual space images of a virtual object that is assumed to be on the desk and that is viewed from viewpoints of the left and right eyes of the operator 7. In this case, instead of directly detecting the positions of left and right eyes of the operator 7, the positions of the viewpoints of the operator 7 can be also detected by an optical position detection method in which the operator 7 wears the stereovision eyeglasses to which markers are attached at parts near the positions of the left and right eyes so that a camera takes pictures of the markers. As a result of this, the stereoscopic image according to the viewpoint of the operator 7 can be projected so that a view can be provided in which a virtual object emerges in a space on the desk as the jetting unit 6.

(Determination Method of the Nozzle)

Next, methods are described for determining a nozzle from which air is jetted when presenting a force including a (lateral) component perpendicular to the jetting direction of the air. Processes described below are executed by the jet control unit 5 of the force feedback apparatus.

Figure 11:
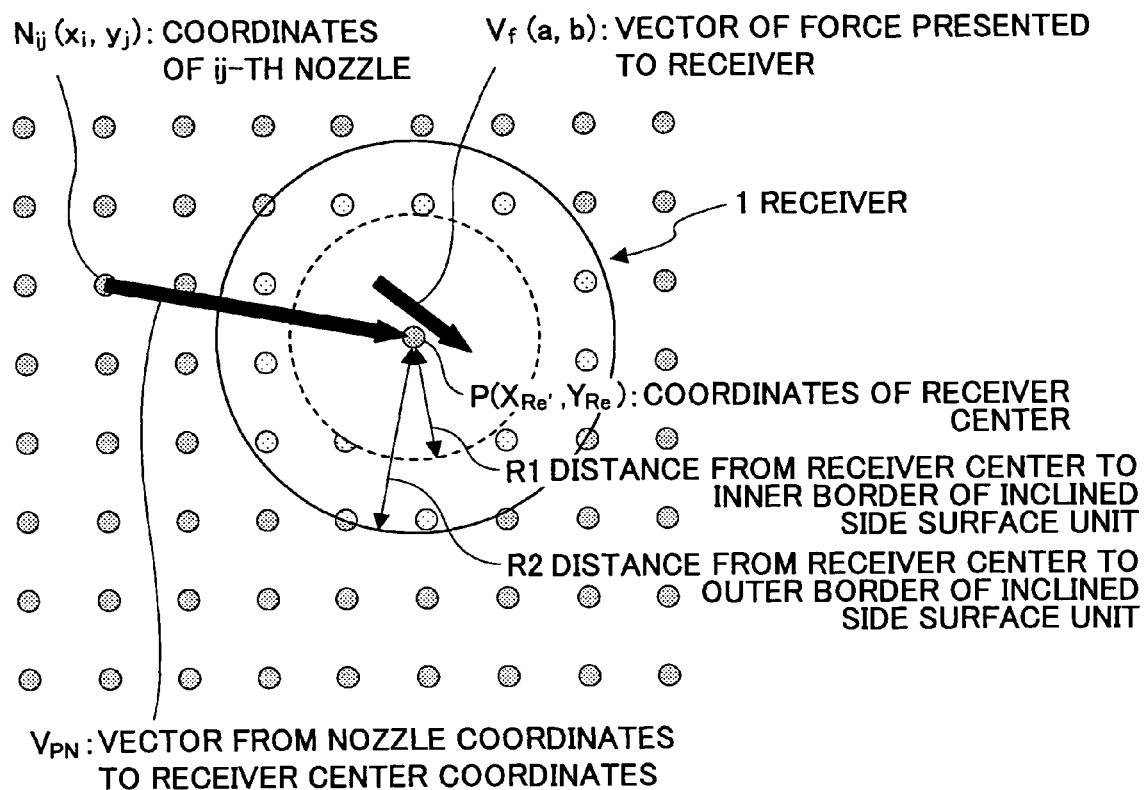
FIG. 11 is a figure showing a jetting unit including a plurality of nozzles on a plane and a receiver in which the inclined side surface unit is provided all around the center unit of the receiver that are looked down upon from an upper point.
Figure 12:
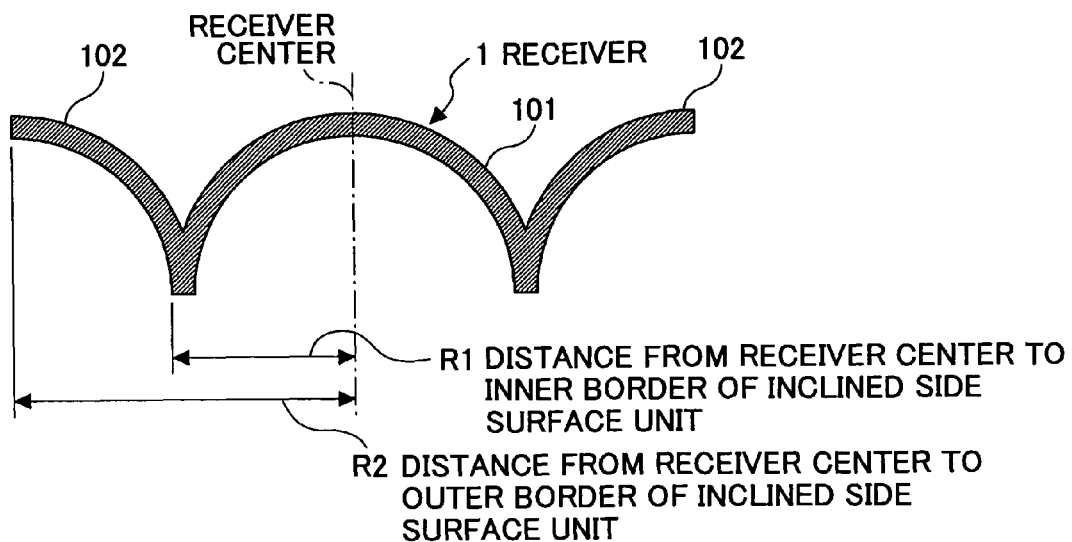
FIG. 12 shows a section view of the receiver.

FIG. 11 is a figure showing the jetting unit 6 including a plurality of nozzles 602 on a plane and a receiver 1 in which the inclined side surface unit 102 is provided all around the center unit 101 of the receiver 1, which are looked down upon from an upper point. FIG. 12 shows a section view of the receiver 1 used here.

As shown in FIG. 11, it is assumed that coordinates of a center P of the receiver 1 are $(X_{Re}, Y_{Re})$, a distance from the center P of the receiver 1 to an inner border of the inclined side surface unit (that is, an outer border of the center unit) is R1, a distance from the receiver center P to an outer border of the inclined side surface unit is R2, coordinates of an ij-th nozzle $N_{ij}$ are $(X_i, Y_j)$, a vector indicating a direction of a force presented to the receiver 1 is $V_f$: (a, b), and that a vector from the nozzle $N_{ij}$ to the receiver center P is $V_{PN}$.

First, a case is considered in which jet amounts and jet pressures are the same for all nozzles. Assuming that the nozzles are arranged thickly enough so that they exist on every position, a nozzle that satisfies $V_f \times |V_{PN}|/|V_f| = V_{PN}$ and $R1 \leq |V_{PN}| \leq R2$ (equation 1) is selected for presenting a force of a direction $V_f$: (a, b). That is, a nozzle that is placed between the inner border of the inclined side surface unit and the outer border of the inclined side surface unit wherein a direction from the nozzle to the center P is the same as that of the force is selected, and air is jetted from the nozzle. When there are a plurality of nozzles that satisfy equation 1, air is jetted from the plurality of nozzles. Alternatively, when there are a plurality of nozzles that satisfy equation 1, one or a specified number of nozzles are selected in the following way when the number of nozzles that jet air at the same time is limited to one or the specified number.

For obtaining a lateral force as large as possible, it is necessary to provide a force to the receiver 1 efficiently. For this purpose, it is desirable the air flows outside along the inclined surface of the inclined side surface unit 102. For this purpose, it is desirable that an air jet be received at a position near the lowest part of the inclined curve of the inclined side surface unit 102 in an effective existing range of the inclined side surface unit 102. That is, it is desirable that an air jet be received at a position near the center unit 101 in the inclined side surface unit 102. Therefore, when there are a plurality of nozzles that satisfy the equation 1, a nozzle by which $|V_{PN}|$ is the smallest is selected. Alternatively, when the specified number of nozzles are selected, the number of nozzles are selected beginning from one by which $|V_{PN}|$ is the smallest.

Figure 13:
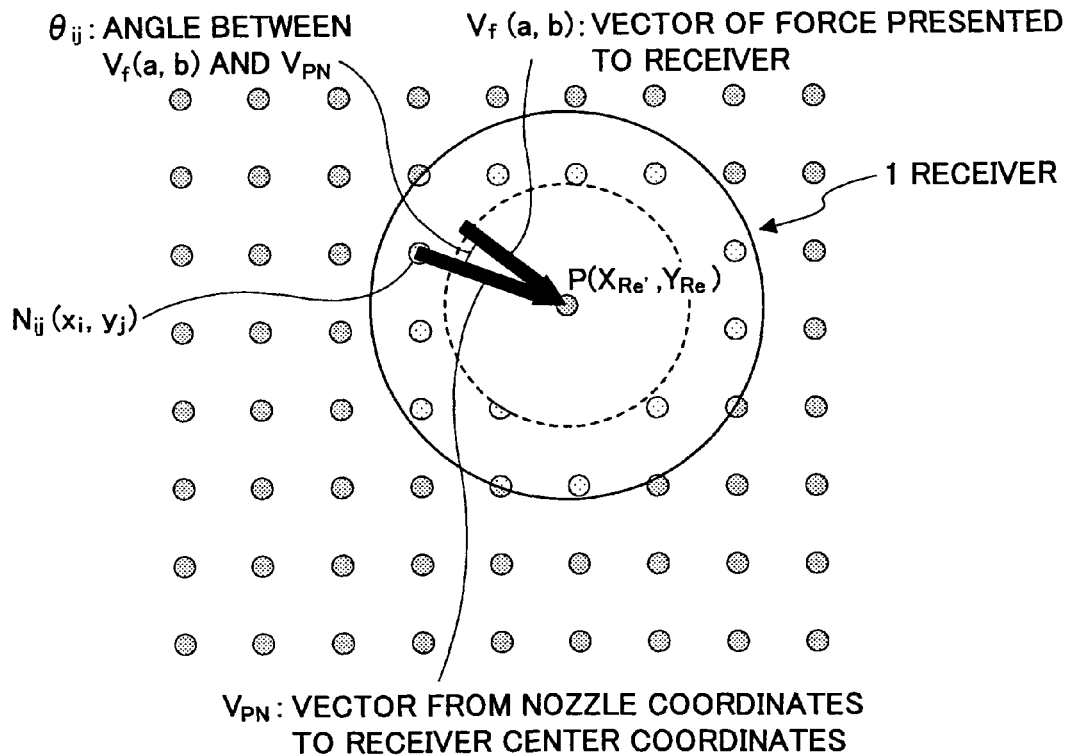
FIG. 13 is a figure for explaining an angle $\theta_{ij}$ between $V_f$ and $V_{PN}$.

When nozzles are placed sparsely, there is a case where none of the nozzles satisfy $V_f \times |V_{PN}|/|V_f| = V_{PN}$. In this case, a nozzle having $V_{PN}$ that is close to $V_f$ is selected. More precisely, as shown in FIG. 13, assuming that an angle between $V_f$ and $V_{PN}$ is $\theta_{ij}$, a nozzle by which $|\theta_{ij}|$ is the smallest is selected from nozzles that satisfy $R1 \leq |V_{PN}| \leq R2$ (equation 2). By the way, $\theta_{ij} = \cos^{-1}\{V_f^* V_{PN}\}/\{|V_f||V_{PN}|\}$ (* indicates an inner product) holds true. That is, in this case, a nozzle that is placed between the inner border of the inclined side surface unit and the outer border of the inclined side surface unit wherein a direction from the nozzle to the center P is nearest to a direction of the force is selected, and air is jetted from the nozzle. When there are a plurality of nozzles having the smallest $|\theta_{ij}|$, a nozzle for which $|V_{PN}|$ is the smallest is selected.

In addition, for placing priority on strength of the force provided to the receiver 1, a nozzle for which $|V_{PN}|$ is the smallest may be selected from nozzles having $\theta_{ij}$ within a predetermined range. That is, a nozzle for which $|V_{PN}|$ is the smallest is selected from nozzles that satisfy $R1 \leq |V_{PN}| \leq R2$ and $0 \leq |\theta_{ij}| \leq \gamma$ (equation 3). That is, in this case, a nozzle is selected from nozzles for each of which an angle difference between a direction from the nozzle to the center P and a direction of the force is equal to or less than a predetermined value, wherein the nozzle to be selected is placed between the inner border of the inclined side surface unit and the outer border of the inclined side surface unit and a distance between the nozzle to be selected and the center P is the smallest, and air is jetted from the nozzle.

For using a plurality of nozzles for jetting air at the same time, vectors from each of the plurality nozzles jetting air at the same time to the center P are composed so as to set a virtual vector $V_{PN}$. Then, in the same way as the above-mentioned way, the plurality of nozzles are determined.

When jet amounts or jet pressures are different for each of the nozzles, the vector $V_{PN}$ for each nozzle is determined based on an air jet amount or a jet pressure of the nozzle in addition to the coordinates of the nozzle and the coordinates of the receiver center P. For example, the direction of $V_{PN}$ is set to be from the nozzle to the receiver center, and the size of $V_{PN}$ is set to be proportional to the distance between the nozzle and the receiver center P and inversely proportional to the air jet amount or the jet pressure. For example, when an air jet amount of a nozzle is large, the size of $V_{PN}$ is smaller than the actual distance between the nozzle and the receiver center P, so that by selecting a nozzle that satisfies $R1 \leq |V_{PN}| \leq R2$, a nozzle outside of the outer border of the inclined side surface unit can be selected.

In the methods shown in equations 1-3, other than using actual values of the sizes of the center unit 101 and the inclined side surface unit 102 as values of R1 and R2, they can be set in consideration of an effective range of the inclined side surface unit 102 for presenting a force whose strength is based on an application, such as a force necessary for giving feeling that the operator contacts an object. In addition, they may be set in consideration of an error and the like of a measurement position.

For example, when an effective range (indicated by distance R from the receiver center P) for realizing a necessary providing force is determined to be R1+α≦R≦R2−β (α, β>0), it is only necessary to replace R1 with R1+α and to replace R2 with R2−β in the methods shown in equations 1-3. However, since there may be a case where α or β varies according to the position of the receiver 1, each of α and β may be set to be a function of the position of the receiver 1 by measuring R at various positions of the receiver 1.

In the above-mentioned methods for determining a nozzle, it is assumed that the receiver having the ring-shaped inclined side surface unit 102 is used. In the case of the receiver having the ring-shaped inclined side surface unit 102, since a force of an arbitrary (lateral) direction that is perpendicular to the jetting direction can be presented, the vector $V_f$ indicating a direction of the force presented to the receiver 1 can be set to be arbitrary direction in the methods of equations 1-3.

On the other hand, for the receiver having the inclined side surface unit 102 of the shape shown in FIGS. 8A-8C, and the receiver having the inclined side surface unit 102 of the shape shown in FIGS. 9A-9C, although directions of the force that can be presented are limited, the methods shown in equations 1-3 can be used as they are for determining the nozzle by setting the vector $V_f$ to be the limited directions.

Figure 14A:
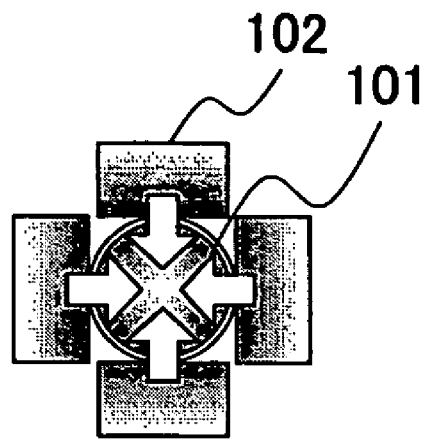
FIG. 14A is a figure for explaining a force presented to the operator by the receiver in which a part of a cylinder is used for each inclined surface of the inclined side surface unit.
Figure 14B:
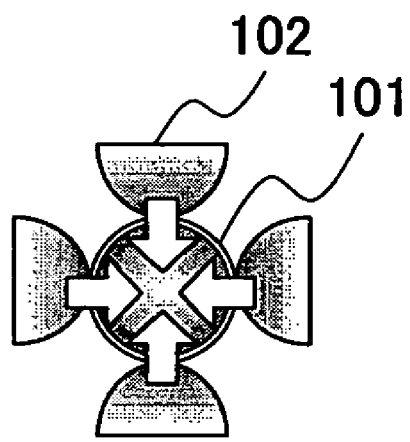
FIG. 14B is a figure for explaining a force presented to the operator by the receiver in which the inclined surface of the inclined side surface unit 102 of the receiver is configured to be a curved surface shape in which a cross section, parallel to the xy plane, of the inclined surface is a concave curved line with respect to a position on the xy plane of the nozzles.

This case is described with reference to FIGS. 14A and B taking a concrete example. FIG. 14A is a figure for explaining a force presented to the operator by the receiver shown in FIGS. 8A-8C in which a part of a cylinder shape is used for each inclined surface of the inclined side surface unit 102. FIG. 14B is a figure for explaining a force presented to the operator by the receiver shown in FIGS. 9A-9C in which each inclined surface is formed to be a curved surface shape such that a section, parallel to the xy plane, of the inclined surface is a convex curved line with respect to a position of a nozzle on the xy plane. Each of the receivers shown in FIGS. 14A and 14B includes the inclined side surface unit 102 including four inclined surfaces.

For the receivers shown in FIGS. 14A and 14B, by impinging the jet air on an upper side of an inclined surface side unit 102 of each figure, a downward force on the figure can be presented to the operator. In the same way, by impinging the jet air on a lower side, a left side, and a right side of the inclined surface side unit, upward, rightward and leftward forces on the figure can be presented to the operator respectively.

That is, when the number of nozzles that jet air at the same time is determined to be one, in the methods shown as the equations 1-3, by setting the direction of the vector $V_f$ to be upward, downward, leftward and rightward on each figure, four directions of forces of upward, downward, leftward and rightward on the figure can be presented. By the way, by increasing the number of inclined surfaces that form the inclined side surface unit 102, the number of directions that can be presented can be increased. In addition, when using a plurality of nozzles that jet air at the same time, by composing a plurality of forces that are generated when impinging a plurality of air jets to different inclined surfaces so as to present the composed force, the number of directions that can be presented can be increased.

Embodiment 2

Figure 15:
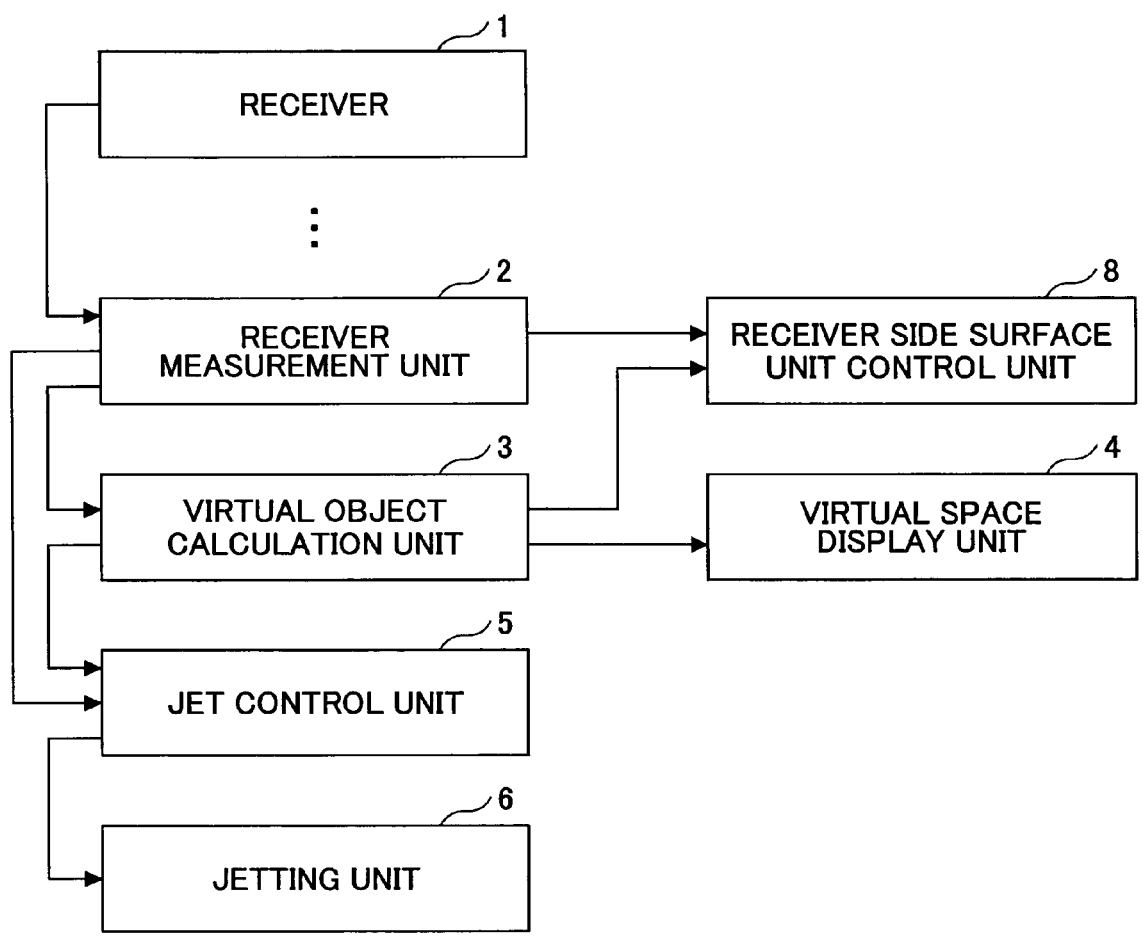
FIG. 15 is a block diagram of a force feedback apparatus of an embodiment 2.
Figure 16:
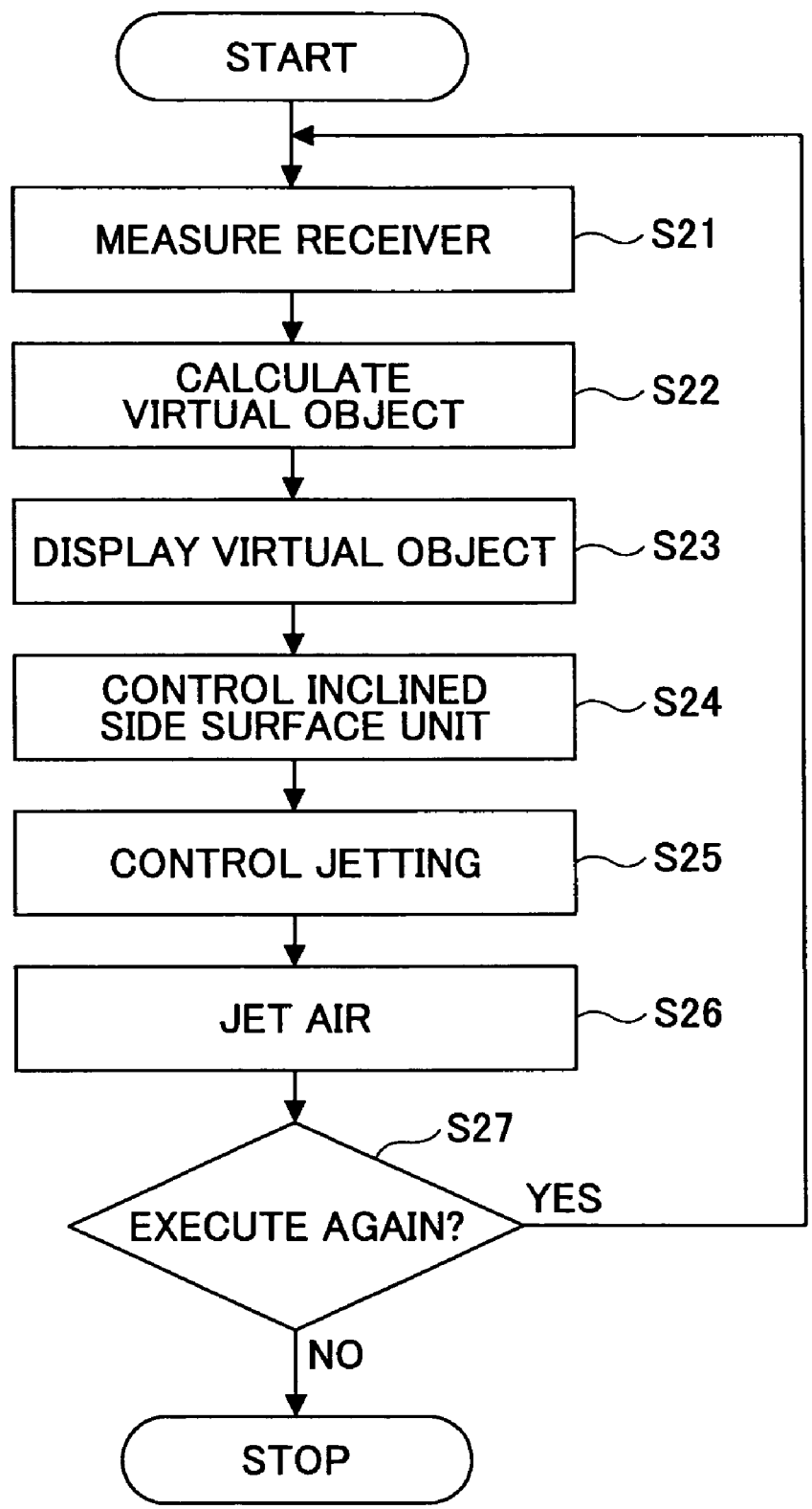
FIG. 16 is a flowchart of operation processes of the force feedback apparatus of the embodiment 2.

FIG. 15 shows a block diagram showing a configuration of the force feedback apparatus of the embodiment 2. FIG. 16 shows a flowchart of processes of the force feedback apparatus.

In this embodiment 2, the inclined side surface unit 102 of the receiver 1 includes a deformation mechanism that can change a position or an inclination of the inclined side surface unit 102 of the receiver 1. In addition, as shown in FIG. 15, the force feedback apparatus of the embodiment 2 includes a receiver side surface unit control unit 8 that can change the position or the inclination of the inclined side surface unit 102 of the receiver 1 according to the states of the virtual object in the virtual space or according to the position or the orientation of the receiver 1. In this case, it is desirable that the inclined side surface unit 102 be shaped to be divided into a plurality of divided parts as shown in FIG. 4E. The receiver side surface unit control unit 8 with the virtual object calculation unit 3 and the jet control unit 5 can be realized by loading a program that causes the computer to execute these processes on the computer. In addition, the receiver side surface control unit 8 and the deformation mechanism of the receiver 1 are connected by a line or by wireless communications so that a control signal can be sent from the receiver side surface unit control unit 8 to the receiver 1.

As shown in FIG. 16, the processes of the force feedback apparatus in the embodiment 2 are different from that of the force feedback apparatus in the embodiment 1 in that an inclined side surface control process (step 24) is added between the virtual object display process (step 23) and the jet control process (step 25). Accordingly, in FIG. 16, steps S21, S22, S23, S25, S26, and S27 are analogous to steps S11, S12, S13, S14, S15, and S16, respectively, of FIG. 3. In step 24, the receiver side surface unit control unit 8 controls the position or the orientation of the inclined side surface unit 102 so as to keep the direction of the inclined side surface unit 102 to be constant with respect to flow of air jetted from a nozzle. This control is performed based on the measured position or the orientation of the receiver 1 or based on the states of the virtual object in the virtual space.

For example, when the receiver measurement unit 2 detects that the receiver 1 is inclined, a detection signal of this event is sent to the receiver side surface control unit 8. The receiver side surface control unit 8 determines rotation amount and the like for the inclined side surface unit 102 such that the state of the inclined side surface unit 102 becomes the same as the state of the inclined side surface unit 102 before the receiver 1 is inclined, so that the receiver side surface control unit 8 sends a control signal corresponding to the rotation amount and the like to the receiver 1.

Figure 17A:
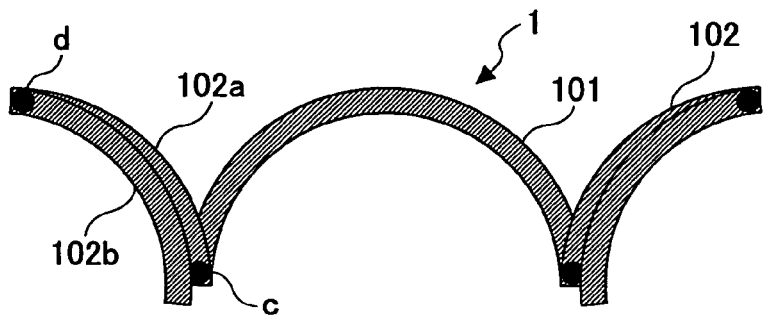
FIG. 17A is a schematic diagram (1) of the receiver of the embodiment 2.

As show in FIG. 17A, for example, the inclined side surface unit 102 of the embodiment 2 is formed of dual inside/outside blades 102a and 102b. The blade 102a and the center unit 101 are connected such that the blade 102a can rotate around a supporting point c. In addition, the blade 102a and the blade 102b are connected such that each of them can rotate around a supporting point d. In addition, each supporting point is provided with a driving apparatus for receiving a control signal from the receiver side surface unit control unit 8 to rotate the blade.

Figure 17B:
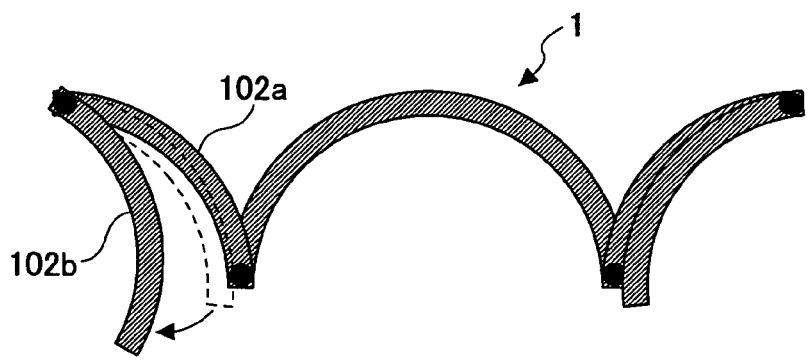
FIG. 17B is a schematic diagram (2) of the receiver of the embodiment 2.
Figure 17C:
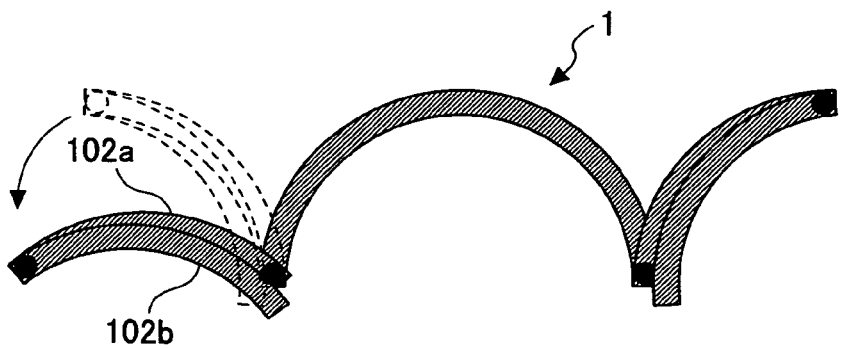
FIG. 17C is a schematic diagram (3) of the receiver of the embodiment 2.

As shown in FIG. 17B, for example, the receiver side surface unit control unit 8 can control the inclined side surface unit 102 so as to rotate only the inside blade 102b. In addition, As shown in FIG. 17C, for example, the receiver side surface unit control unit 8 can control the inclined side surface unit 102 so as to rotate the dual inside/outside blades 102a and 102b as a whole with respect to the center unit 101 to move them upward or downward. By the way, when it is only necessary to rotate the side surface in the direction shown in FIG. 17C, the inclined side surface unit 102 can be realized without using the double blades.

As an example for using the embodiment 2, a case is described where the orientation of the receiver 1 changes with respect to the jetting unit 6 on which one or more nozzles 602 for jetting air upward are arranged.

When the orientation (posture) of the receiver changes as a whole with respect to the air jet direction of the nozzle 602 that is jetting air to the inclined side surface unit 102 for presenting a lateral force, the orientation of the inclined side surface unit 102 coupled with the receiver 1 also changes with respect to the jetting direction, so that the direction of the force to be presented to the operator 7 also changes.

Therefore, when the orientation of the receiver 1 changes, as shown in step S24 in the flowchart of FIG. 16, the orientation of the inclined side surface unit 102 of the receiver 1 is changed according to the change of the orientation, so as not to change the direction (orientation) of the inclined side surface unit 102 with respect to the flow of the jet air 601. Accordingly, the direction of the force to be presented can be kept constant.

Figure 18A:
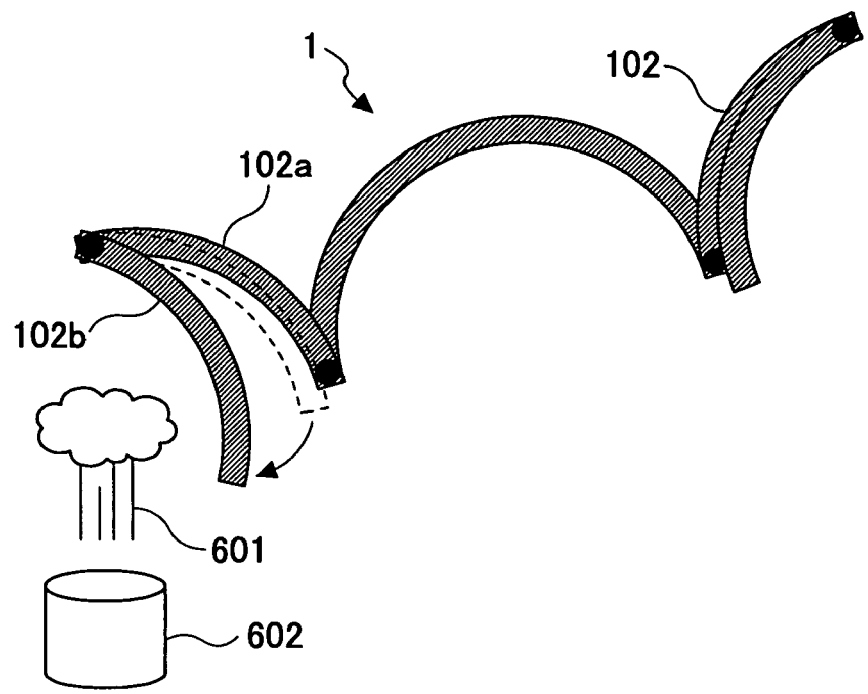
FIG. 18A is a schematic diagram (1) for explaining posture control for the receiver of the embodiment 2.

FIG. 18A shows an example for controlling the inclination of the inclined side surface unit 102 by controlling the blade 102b. This example shows a case where the receiver 1 rotates by an angle in the anticlockwise direction from the state of FIG. 17A. In this case, the blade 102b is rotated in the clockwise direction as shown in FIG. 18A with respect to the blade 102a. Accordingly, the orientation of the part that receives air in the inclined side surface unit 102 can be kept to be the same as that of the part that receives air in the inclined side surface unit 102 as shown in FIG. 17A.

Figure 18B:
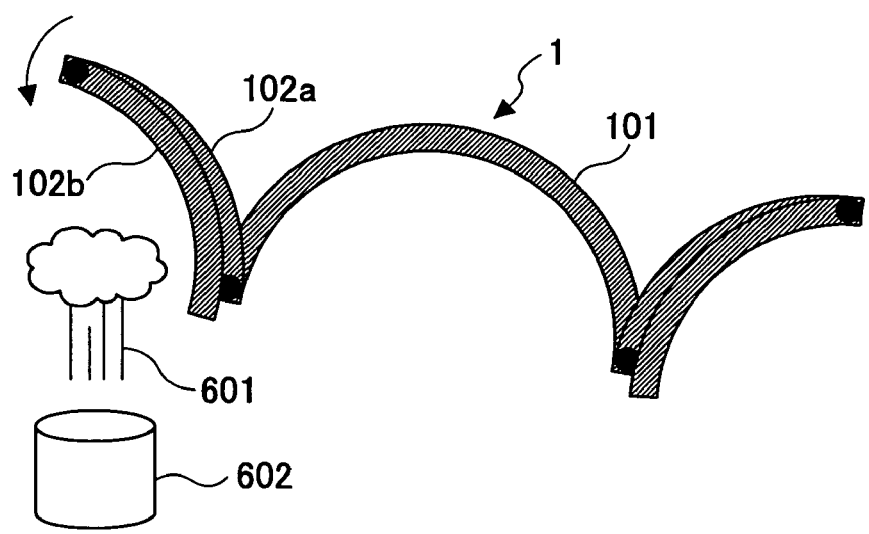
FIG. 18B is a schematic diagram (2) for explaining posture control for the receiver of the embodiment 2.
Figure 19:
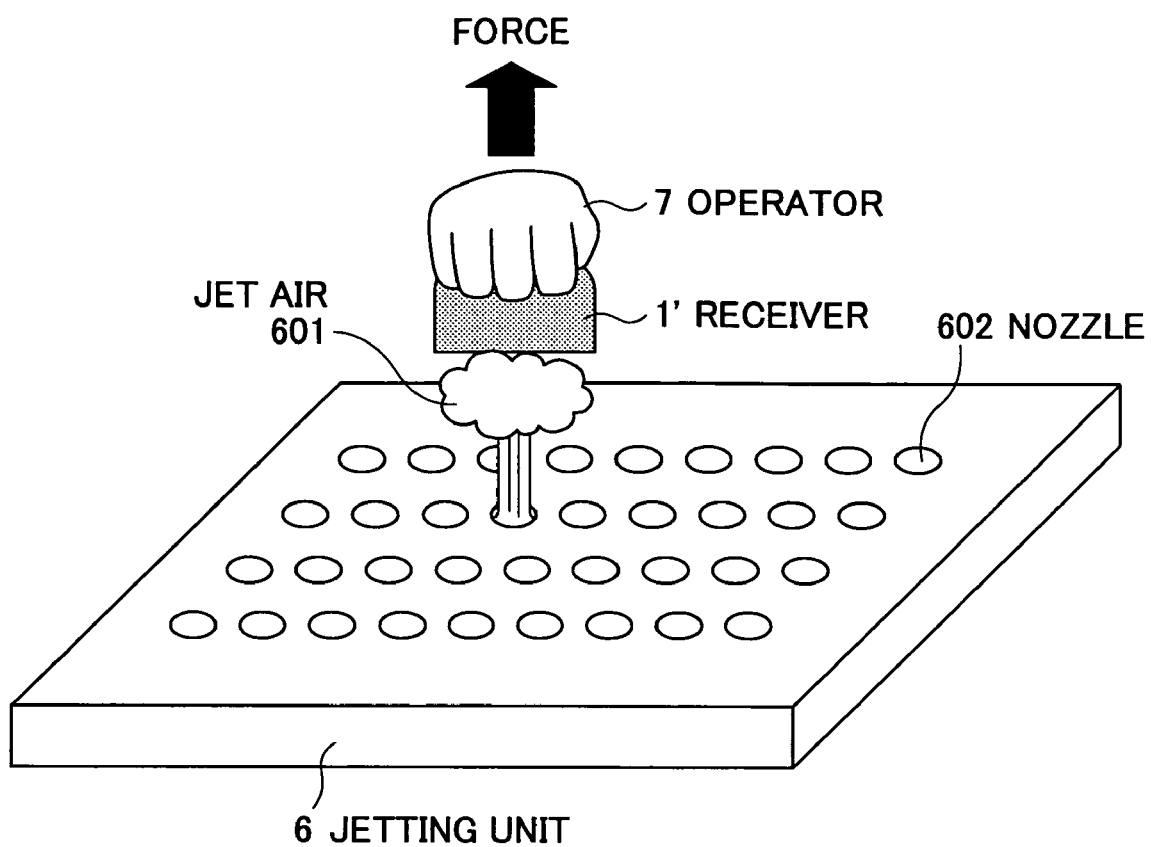
FIG. 19 is a schematic diagram showing a relationship among a receiver, a jetting unit and an operator of a force feedback apparatus of a conventional example.

FIG. 18B shows an example in which the blades 102a and 102b are controlled as a unit. This example shows a case where the receiver 1 rotates in the clockwise direction by an angle from the state of FIG. 17A. In this case, the blades 102a and 102b are rotated as a unit in the anticlockwise direction with respect to the center unit 101. Accordingly, the orientation of the inclined side surface unit 102 can be kept to be the same as that of the inclined side surface unit 102 in the state shown in FIG. 17A. By the way, the position and the orientation of the blade are changed by rotating the blade around a supporting point. In the above-mentioned example, although a configuration for rotating the blade around a supporting point is shown, any configuration can be adopted as long as the position or the orientation of the blade can be changed. For example, the blade may be configured to be extensible. In addition, the blade itself may be configured to be deformable.

In addition, even when the orientation of the receiver 1 is not changed with respect to the jet direction of the jet air 601, the inclination of the inclined side surface unit 102 can be controlled according to states of the virtual object in the virtual space. By changing the inclination of the inclined side surface unit 102, the direction in which the jet air 601 flows out from the inclined side surface unit 102 of the receiver 1 can be changed with respect to the direction of the jet air 601, so that the direction of the force applied to the receiver 1 can be controlled according to the states of the virtual object in the virtual space.

The present invention is not limited to the specifically disclosed embodiments, and variations and modifications may be made without departing from the scope of the invention.

The invention claimed is:

1. A force feedback method, comprising:
    placing a receiver at a predetermined height above a plurality of nozzles arranged on a plane, the receiver including a concave center unit that declines radially outward from an axis of symmetry of the receiver to an outer border of the concave center unit, such that a shape of the concave center unit is a hemisphere, and an inclined side surface unit that inclines radially outward from the outer border of the concave center unit with respect to the axis of symmetry,
    selecting a nozzle for which $|V_{PN}|$ is the smallest from among candidate nozzles on the plane that satisfy $R1 \leq |V_{PN}| \leq R2$ and $0 \leq |\theta_{ij}| \leq \gamma$, wherein $|V_{PN}|$ indicates a distance between a candidate nozzle and the axis of symmetry of the receiver, R1 indicates a distance between the axis of symmetry of the receiver and an inner border of the inclined side surface unit, R2 indicates a distance between the axis of symmetry of the receiver and an outer border of the inclined side surface unit, $|\theta_{ij}|$ indicates an absolute value of an angle between a first direction from the candidate nozzle to the axis of symmetry of the receiver and a second direction of a force to be provided to the receiver, and $\gamma$ indicates a predetermined value for the angle, and
    jetting a gas or a liquid from the selected nozzle upon the inclined side surface unit of the receiver to convey a force in a direction perpendicular to a direction of the jetting gas or liquid toward the axis of symmetry of the receiver.

2. The force feedback method as claimed in claim 1, further comprising the step of:
    positioning the inclined side surface unit according to a position or an orientation of the receiver.

3. The force feedback method as claimed in claim 2, further comprising the step of:
    calculating a virtual object according to the position or the orientation of the receiver, so as to display a virtual space including the virtual object based on a result of the calculating.

4. A force feedback apparatus, comprising:
    jetting means for jetting a gas or a liquid from a plurality of nozzles arranged in a plane,
    receiver means including a concave center unit that declines radially outward from an axis of symmetry of the receiver means to an outer border of the concave center unit, such that a shape of the concave center unit is a hemisphere, and an inclined side surface unit that inclines radially outward from the outer border of the concave center unit with respect to the axis of symmetry, the inclined side surface unit for conveying a force perpendicular to a direction of the jetting gas or liquid toward the axis of symmetry of the receiver means, the receiver means placed at a predetermined height above the plane, and
    jet control means for selecting a nozzle for which $|V_{PN}|$ is the smallest from among candidate nozzles on the plane that satisfy $R1 \leq |V_{PN}| \leq R2$ and $0 \leq |\theta_{ij}| \gamma$, wherein $|V_{PN}|$ indicates a distance between a candidate nozzle and the axis of symmetry of the receiver means, R1 indicates a distance between the axis of symmetry of the receiver means and an inner border of the inclined side surface unit, R2 indicates a distance between the axis of symmetry of the receiver means and an outer border of the inclined side surface unit, $|\theta_{ij}|$ indicates an absolute value of an angle between a first direction from the candidate nozzle to the axis of symmetry of the receiver means and a second direction of a force to be provided to the receiver means, and $\gamma$ indicates a predetermined value for the angle, and for controlling the jetting means for jetting the gas or the liquid from the selected nozzle.

5. The force feedback apparatus as claimed in claim 4, further comprising:

a deformation mechanism means for changing a position or an orientation of the inclined side surface unit, and receiver inclined side surface control means for controlling the deformation mechanism according to the position or the orientation of the receiver means, as measured by a receiver measurement means.

6. The force feedback apparatus as claimed in claim 5, further comprising:

virtual object calculation means for calculating a virtual object in a virtual space according to the position or the orientation of the receiver means, as measured by the receiver measurement means, and for causing a virtual object display means to display the virtual space including the virtual object based on a result of the calculation.

7. A non-transitory computer readable storage medium storing a program for causing a computer to realize a force feedback method, the program, when executed by a processor of the computer, causing the computer to execute the steps of:

selecting a nozzle for which $|V_{PN}|$ is the smallest from among candidate nozzles on a plane that satisfy $R1 \leq |V_{PN}| \leq R2$ and $0 \leq |\theta_{ij}| \leq \gamma$, wherein $|V_{PN}|$ indicates a distance between a candidate nozzle and a center axis of a receiver, the receiver including a concave center unit that declines radially outward from an axis of symmetry of the receiver to an outer border of the concave center unit, such that a shape of the concave center unit is a hemisphere, and an inclined side surface unit that inclines radially outward from the outer border of the concave center unit with respect to the axis of symmetry, R1 indicates a distance between the axis of symmetry of the receiver and an inner border of the inclined side surface unit, R2 indicates a distance between the axis of symmetry of the receiver and an outer border of the inclined side surface unit, $|\theta_{ij}|$ indicates an absolute value of an angle between a first direction from the candidate nozzle to the axis of symmetry of the receiver and a second direction of a force to be provided to the receiver, and $\gamma$ indicates a predetermined value for the angle, and jetting a gas or a liquid from the selected nozzle upon the inclined side surface unit of the receiver to convey a force in a direction perpendicular to a direction of the jetting gas or liquid toward the axis of symmetry of the receiver.

8. The non-transitory computer readable storage medium storing a program as claimed in claim 7, the program further causing the computer to execute the steps of:

changing a position or an orientation of the inclined side surface unit according to the position or the orientation of the receiver, as measured by a receiver measurement unit.

9. The non-transitory computer readable storage medium storing a program as claimed in claim 8, the program further causing the computer to execute the steps of:

calculating a virtual object in a virtual space according to the position or the orientation of the receiver, as measured by the receiver measurement unit, and causing a virtual space display means to display the virtual space including the virtual object based on a result of the calculation.

10. A force feedback method, comprising:

selecting one or more of a plurality of nozzles arranged in a plane for which $|V_{PN}|$ is the smallest from among candidate nozzles on the plane that satisfy $R1 \leq |V_{PN}| \leq R2$ and $0 \leq |\theta_{ij}| \leq \gamma$, wherein $|V_{PN}|$ indicates a distance between a candidate nozzle or plurality of nozzles and the axis of symmetry of a receiver, the receiver including a concave center unit that declines radially outward from an axis of symmetry of the receiver to an outer border of the concave center unit, such that a shape of the concave center unit is a hemisphere, and an inclined side surface unit that inclines radially outward from the outer border of the concave center unit with respect to the axis of symmetry, R1 indicates a distance between the axis of symmetry of the receiver and an inner border of the inclined side surface unit, R2 indicates a distance between the axis of symmetry of the receiver and an outer border of the inclined side surface unit, $|\theta_{ij}|$ indicates an absolute value of an angle between a first direction from a candidate nozzle to the axis of symmetry of the receiver and a second direction of a force to be provided to the receiver, and $\gamma$ indicates a predetermined value for the angle;

jetting a gas or a liquid from the selected one or more nozzles upon a center of a receiver to convey a force in a direction of the jetting gas or liquid; and jetting the gas or the liquid from the selected one or more nozzles upon the inclined side surface unit of the receiver to convey a force in a direction perpendicular to the direction of the jetting gas or liquid toward the axis of symmetry of the receiver.

11. A force feedback apparatus, comprising:

a plurality of nozzles arranged in a plane, each nozzle to jet a gas or a liquid;

a receiver including a concave center unit that declines radially outward from an axis of symmetry of the receiver to an outer border of the concave center unit, such that a shape of the concave center unit is a hemisphere, and an inclined side surface unit that inclines radially outward from the outer border of the concave center unit with respect to the axis of symmetry; and a controller to select one or more of the plurality of nozzles arranged in a plane for which $|V_{PN}|$ is the smallest from among candidate nozzles on the plane that satisfy $R1 \leq |V_{PN}| \leq R2$ and $0 \leq |\theta_{ij}| \leq \gamma$, wherein $|V_{PN}|$ indicates a distance between a candidate nozzle or plurality of nozzles and the axis of symmetry of the receiver, R1 indicates a distance between the axis of symmetry of the receiver and an inner border of the inclined side surface unit, R2 indicates a distance between the axis of symmetry of the receiver and an outer border of the inclined side surface unit, $|\theta_{ij}|$ indicates an absolute value of an angle between a first direction from a candidate nozzle to the axis of symmetry of the receiver and a second direction of a force to be provided to the receiver, and $\gamma$ indicates a predetermined value for the angle, and to control the selected one or more of the plurality nozzles to jet the gas or the liquid upon the concave center unit to convey a force in a direction of the jet gas or liquid, and to jet the gas or the liquid upon the inclined side surface unit to convey a force perpendicular to the direction of the jet gas or liquid toward the axis of symmetry of the receiver.

12. A non-transitory computer readable storage medium storing a program, which, when executed by a computer processor, causes the computer to execute a force feedback method, comprising the steps of:

selecting one or more of a plurality of nozzles arranged in a plane for which $|V_{PN}|$ is the smallest from among candidate nozzles on the plane that satisfy $R1 \leq |V_{PN}| \leq R2$ and $0 \leq |\theta_{ij}| \leq \gamma$, wherein $|V_{PN}|$ indicates a distance between a candidate nozzle or plurality of nozzles and the axis of symmetry of a receiver, the receiver including a concave center unit that declines radially outward from an axis of symmetry of the receiver to an outer border of the concave center unit, such that a shape of the concave center unit is a hemisphere, and an inclined side surface unit that inclines radially outward from the outer border of the concave center unit with respect to the axis of symmetry, R1 indicates a distance between the axis of symmetry of the receiver and an inner border of the inclined side surface unit, R2 indicates a distance between the axis of symmetry of the receiver and an outer border of the inclined side surface unit, $|\theta_{ij}|$ indicates an absolute value of an angle between a first direction from a candidate nozzle to the axis of symmetry of the receiver and a second direction of a force to be provided to the receiver, and $\gamma$ indicates a predetermined value for the angle;

jetting a gas or a liquid from the selected one or more nozzles upon the concave center unit of a receiver to convey a force in a direction of the jetting gas or liquid; and jetting the gas or the liquid from the selected one or more nozzles upon the inclined side surface unit of the receiver to convey a force in a direction perpendicular to the direction of the jetting gas or liquid toward an axis of symmetry of the receiver.

* * * * *